(12) United States Patent
Izadian

(10) Patent No.: US 10,539,656 B2
(45) Date of Patent: Jan. 21, 2020

(54) ANTENNA AND RADAR SYSTEM THAT INCLUDE A POLARIZATION-ROTATING LAYER

(71) Applicant: Google Inc., Mountain View, CA (US)

(72) Inventor: Jamal Izadian, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 672 days.

(21) Appl. No.: 15/215,974

(22) Filed: Jul. 21, 2016

(65) Prior Publication Data
US 2018/0024226 A1    Jan. 25, 2018

(51) Int. Cl.
*G01S 7/02* (2006.01)
*H01Q 5/55* (2015.01)

(52) U.S. Cl.
CPC ........... *G01S 7/024* (2013.01); *H01Q 5/55* (2015.01)

(58) Field of Classification Search
CPC ..................................................... G01S 7/024
USPC ............................................................ 342/188
See application file for complete search history.

(56) References Cited

U.S. PATENT DOCUMENTS

| | | | |
|---|---|---|---|
| 2,975,383 A | 3/1961 | Seling | |
| 3,643,261 A * | 2/1972 | Kenworthy | H01Q 3/22 343/771 |
| 4,311,973 A | 1/1982 | Nuding et al. | |
| 4,378,806 A * | 4/1983 | Henley-Cohn | A61N 5/04 219/759 |
| 5,364,136 A * | 11/1994 | Forti | F16L 25/14 138/122 |
| 6,642,908 B2 * | 11/2003 | Pleva | B60K 31/0008 343/700 MS |
| 6,703,976 B2 * | 3/2004 | Jacomb-Hood | H01Q 1/288 342/373 |

(Continued)

OTHER PUBLICATIONS

Lagasse, Paul, et.al., Square and Rectangular Waveguides with Rounded Corners, May 1972, Institute of Electrical and Electronic Engineers (Year: 1972).*

(Continued)

*Primary Examiner* — Frank J McGue
(74) *Attorney, Agent, or Firm* — McDonnell Boehnen Hulbert & Berghoff LLP

(57) ABSTRACT

An antenna includes a plurality of waveguide antenna elements arranged in a first array configured to operate with a first polarization. The antenna also includes a plurality of waveguide output ports arranged in a second array configured to operate with a second polarization. The second polarization is different from the first polarization. The antenna further includes a polarization-rotating layer with channels defined therein. The polarization-rotating layer is disposed between the waveguide antenna elements and the waveguide output ports. The channels are oriented at a first angle with respect to the waveguide antenna elements and at a second angle with respect to the waveguide output ports. The channels are configured to receive input electromagnetic waves having the first polarization and transmit output electromagnetic waves having a first intermediate polarization. The waveguide output ports are configured to receive input electromagnetic waves and radiate electromagnetic waves having the second polarization.

20 Claims, 12 Drawing Sheets

(56) References Cited

U.S. PATENT DOCUMENTS

| | | | |
|---|---|---|---|
| 6,853,343 B2* | 2/2005 | McCandless | H01Q 15/24 333/21 A |
| 6,970,138 B2 | 11/2005 | McCandless et al. | |
| 8,917,150 B2* | 12/2014 | Vanhille | H01P 3/06 29/828 |
| 2004/0183616 A1 | 9/2004 | McCandles et al. | |
| 2004/0207494 A1* | 10/2004 | Brown | H01P 1/208 333/209 |
| 2005/0146479 A1* | 7/2005 | Stenger | H01P 1/047 343/772 |
| 2005/0151695 A1* | 7/2005 | Chen | H01P 5/02 343/786 |
| 2012/0235882 A1 | 9/2012 | Iverson et al. | |
| 2013/0041576 A1* | 2/2013 | Switkes | G08G 1/166 701/123 |
| 2013/0120205 A1 | 5/2013 | Thomson et al. | |
| 2013/0120206 A1* | 5/2013 | Biancotto | H01Q 21/005 343/776 |
| 2013/0169500 A1 | 7/2013 | Bilotti et al. | |
| 2014/0254976 A1 | 9/2014 | Thomson et al. | |
| 2015/0295651 A1* | 10/2015 | Herbsommer | G02B 6/42 398/116 |

OTHER PUBLICATIONS

Written Opinion of the International Searching Authority, PCT International Serial No. PCT/US2017/040944, dated Oct. 18, 2017, 7 pages.

Dong-yeon Kim; "A Series Slot Array Antenna for 45°-Inclined Linear Polarization With SIW Technology"; IEEE Transactions on Antennas and Propagation, vol. 60, No. 4, Apr. 2012.

\* cited by examiner

ANTENNA AND RADAR SYSTEM THAT INCLUDE A POLARIZATION-ROTATING LAYER

BACKGROUND

Unless otherwise indicated herein, the materials described in this section are not prior art to the claims in this application and are not admitted to be prior art by inclusion in this section.

Radio detection and ranging (RADAR) systems can be used to actively estimate distances to environmental features by emitting radio signals and detecting returning reflected signals. Distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals. Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be identified and/or mapped. The radar sensor can thus be used, for instance, by an autonomous vehicle control system to avoid obstacles indicated by the sensor information.

Some example automotive radar systems may be configured to operate at an electromagnetic wave frequency of 77 Giga-Hertz (GHz), which corresponds to a millimeter (mm) electromagnetic wavelength (e.g., 3.9 mm for 77 GHz). These radar systems may use antennas that can focus the radiated energy into beams in order to enable the radar system to measure an environment with high accuracy, such as an environment around an autonomous vehicle. Such antennas may be compact (typically with rectangular form factors; e.g., 1.3 inches high by 2.5 inches wide), efficient (i.e., there should be little 77 GHz energy lost to heat in the antenna, or reflected back into the transmitter electronics), and cheap and easy to manufacture.

In some radar systems (e.g., radar navigation systems or radio communication systems), the versatility of the radar system can be enhanced by an ability to rotate a polarization associated with an electromagnetic wave that is to be transmitted or has been received. Particularly if the radar system includes the use of waveguides, performing the polarization rotation over a relatively short distance can be crucial to minimize the electromagnetic loss experienced by the radar system.

SUMMARY

In one aspect, the present application describes an antenna. The antenna includes a plurality of waveguide antenna elements arranged in a first array configured to operate with a first polarization. The antenna also includes a plurality of waveguide output ports arranged in a second array configured to operate with a second polarization. The second polarization is different from the first polarization. The antenna further includes a polarization-rotating layer with channels defined therein. The polarization-rotating layer is disposed between the waveguide antenna elements and the waveguide output ports. The channels are oriented at a first angle with respect to the waveguide antenna elements and at a second angle with respect to the waveguide output ports. The channels are configured to receive input electromagnetic waves having the first polarization and transmit output electromagnetic waves having a first intermediate polarization. The waveguide output ports are configured to receive input electromagnetic waves and radiate electromagnetic waves having the second polarization.

In another aspect, the present application describes a radar system. The radar system includes a transmitter. The transmitter includes a plurality of first waveguide antenna elements arranged in a first array configured to operate with a first polarization. The transmitter also includes a first polarization-rotating layer with first channels defined therein. The first polarization-rotating layer is disposed adjacent to the first waveguide antenna elements. The first channels are oriented at a first angle with respect to the first waveguide antenna elements. The first channels are configured to receive input electromagnetic waves having the first polarization and transmit output electromagnetic waves having a second polarization. Additionally, the radar system includes a receiver. The receiver includes a plurality of second waveguide antenna elements arranged in a second array configured to operate with the first polarization. The receiver also includes a second polarization-rotating layer with second channels defined therein. The second polarization-rotating layer is disposed adjacent to the second waveguide antenna elements. The second channels are oriented at the first angle with respect to the second waveguide antenna elements. The second channels are configured to receive input electromagnetic waves having the second polarization and transmit output electromagnetic waves having the first polarization to the second waveguide antenna elements.

In yet another aspect, the present application describes a method. The method includes emitting electromagnetic waves having a first polarization from a plurality of waveguide antenna elements arranged in a first array. The method also includes receiving, by channels defined within a polarization-rotating layer that is disposed between the waveguide antenna elements and a plurality of waveguide output ports arranged in a second array, the electromagnetic waves having the first polarization. The channels are oriented at a first angle with respect to the waveguide antenna elements. The method further includes transmitting, by the channels defined within the polarization-rotating layer, electromagnetic waves having an intermediate polarization. Additionally, the method includes receiving, by the waveguide output ports, electromagnetic waves having the intermediate polarization. The waveguide output ports are oriented at a second angle with respect to the channels. Still further, the method includes radiating, by the waveguide output ports, electromagnetic waves having a second polarization. The second polarization is different from the first polarization. The second polarization is different from the intermediate polarization. The first polarization is different from the intermediate polarization.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
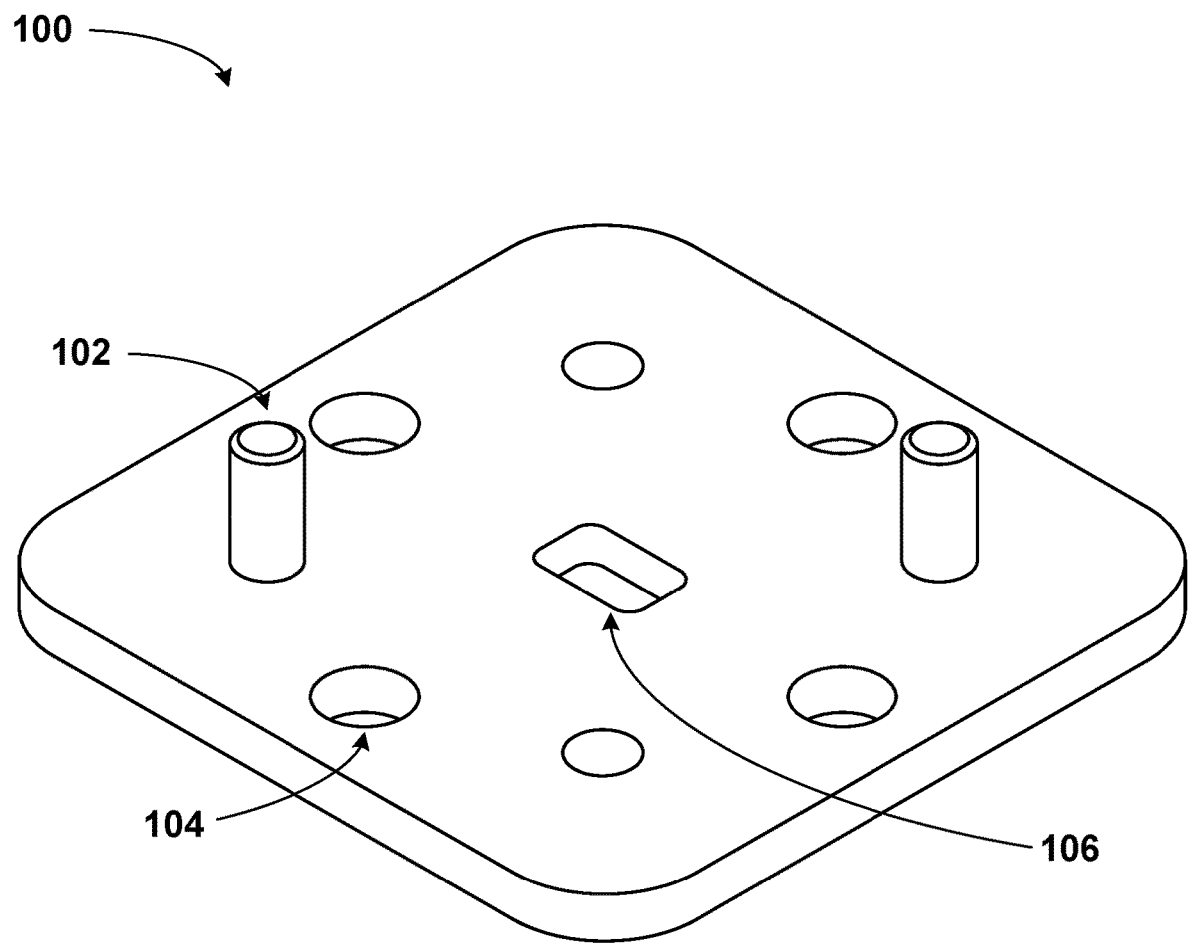
FIG. 1 illustrates a unit cell of a polarization-rotating overlay, according to example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

An example embodiment may include an antenna having a polarization-rotating layer. The antenna may be on a transmission side or a receiving side of a radar system, in various embodiments. Further, the antenna architecture may include a plurality of "dual open-ended waveguide" (DOEWG) antennas. In some examples, the term "DOEWG" may refer to a short section of a horizontal waveguide channel plus a vertical channel that splits into two parts, where each of the two parts of the vertical channel includes an output port configured to radiate at least a portion of electromagnetic waves that enter the antenna. Additionally, a plurality of DOEWG antennas may be arranged into an antenna array.

An example antenna architecture may comprise, for example, multiple metal layers (e.g., aluminum plates) that can be machined with computer numerical control (CNC), aligned properly, and joined together. The first metal layer may include a first half of an input waveguide channel, where the first half of the first waveguide channel includes an input port that may be configured to receive electromagnetic waves (e.g., 77 GHz millimeter waves) into the first waveguide channel. The first metal layer may also include a first half of a plurality of wave-dividing channels. The plurality of wave-dividing channels may comprise a network of channels that branch out from the input waveguide channel and that may be configured to receive the electromagnetic waves from the input waveguide channel, divide the electromagnetic waves into a plurality of portions of electromagnetic waves (i.e., power dividers), and propagate respective portions of electromagnetic waves to respective wave-radiating channels of a plurality of wave-radiating channels. One or more intermediate layers may comprise the polarization-rotating layer. The polarization-rotating layer may have rounded rectangular polarization-rotating channels that act as resonators embedded within.

In example embodiments, the polarization-rotating layer may be disposed between two layers of the antenna. One of the two layers may include an array of waveguide antenna elements (e.g., waveguides of DOEWG antennas) used for radiating or receiving signals. The other layer may include waveguide output ports (i.e., ports between the polarization-rotating layer and the surrounding environment). The polarization-rotating layer may be positioned such that the rounded rectangular polarization-rotating channels are rotated with respect to the waveguide antenna elements and/or the waveguide output ports (e.g., rotated at an angle between 44 and 46 degrees with respect to the waveguide antenna elements and at an angle between 44 and 46 degrees with respect to the waveguide output ports). The waveguide antenna elements and/or the waveguide output ports may be rectangular in shape, in some embodiments. In alternate embodiments, the waveguide antenna elements and/or the waveguide output ports may be circular in shape. Other shapes are also possible. The polarization-rotating layer may be fabricated using CNC machining or metal-plated plastic molding, in various embodiments. The polarization-rotating layer could be fabricated of metal and/or dielectric, in various example embodiments.

The rounded rectangular channels may serve as resonant chambers that can alter the polarization of incoming electromagnetic waves. For example, high energy leakage from one polarization to another polarization (e.g., from a horizontal $TE_{10}$ polarization to a vertical $TE_{10}$ polarization) may occur within the chamber. Unlike alternative methods of changing polarization in waveguides that make use of physical twists in a waveguide occurring over a many wavelength distance, the thickness of the polarization-rotating layer can be less than a wavelength (e.g., between a half and a whole wavelength of corresponding input electromagnetic waves) while still achieving sufficient polarization conversion. The rounded rectangular polarization-rotating channels may also be designed such that evanescent waveguide modes emanating from the channel die out sufficiently quickly as they propagate away from the channel. Because of both of these factors, less energy loss may occur during the polarization conversion, resulting in increased energy efficiency when compared with alternate methods of rotating/changing polarization.

Based on the shape and the materials of the corresponding polarization-rotating channels and waveguides, the distribution of propagating energy can vary at different locations within the antenna, for example. The shape and the materials of the polarization-rotating channels and waveguides define the boundary conditions for the electromagnetic energy. Boundary conditions are known conditions for the electromagnetic energy at the edges of the polarization-rotating channels and waveguides. For example, in a metallic waveguide, assuming the polarization-rotating channel and waveguide walls are nearly perfectly conducting (i.e., the waveguide walls can be approximated as perfect electric conductors—PECs), the boundary conditions specify that there is no tangentially (i.e., in the plane of the waveguide wall) directed electric field at any of the wall sides. Once the boundary conditions are known, Maxwell's Equations can be used to determine how electromagnetic energy propagates through the polarization-rotating channels and waveguides.

Maxwell's Equations may define several modes of operation for any given polarization-rotating channel or waveguide. Each mode has one specific way in which electromagnetic energy can propagate through the polarization-rotating channel or waveguide. Each mode has an associated cutoff frequency. A mode is not supported in a polarization-rotating channel or waveguide if the electromagnetic energy has a frequency that is below the cutoff frequency. By properly selecting both (i) dimensions and (ii) frequency of operation, electromagnetic energy may propagate through the polarization-rotating channels and waveguides in specific modes. The polarization-rotating channels and/or the waveguides can be designed so only one propagation mode is supported at the design frequency.

There are four main types of waveguide propagation modes: Transverse Electric (TE) modes, Transverse Magnetic (TM) modes, Transverse Electromagnetic (TEM) modes, and Hybrid modes. In TE modes, the electromagnetic energy has no electric field in the direction of the electromagnetic energy propagation. In TM modes, the electromagnetic energy has no magnetic field in the direction of the electromagnetic energy propagation. In TEM modes, the electromagnetic energy has no electric or magnetic field in the direction of the electromagnetic energy propagation. In Hybrid modes, the electromagnetic energy has some of both electric field and magnetic field the direction of the electromagnetic energy propagation.

TE, TM, and TEM modes can be further specified using two suffix numbers that correspond to two directions orthogonal to the direction of propagation, such as a width direction and a height direction. A non-zero suffix number indicates the respective number of half-wavelengths of the electromagnetic energy equal to the width and height of the respective polarization-rotating channel or waveguide (e.g., assuming a rectangular waveguide). However, a suffix number of zero indicates that there is no variation of the field with respect to that direction. For example, a $TE_{10}$ mode indicates the polarization-rotating channel or waveguide is half-wavelength in width and there is no field variation in the height direction. Typically, when the suffix number is equal to zero, the dimension of the waveguide in the respective direction is less than one-half of a wavelength. In another example, a $TE_{21}$ mode indicates the waveguide is one wavelength in width (i.e., two half wavelengths) and one half wavelength in height.

When operating a waveguide in a TE mode, the suffix numbers also indicate the number of field-maximums along the respective direction of the waveguide. For example, a $TE_{10}$ mode indicates that the waveguide has one electric field maximum in the width direction and zero maxima in the height direction. In another example, a $TE_{21}$ mode indicates that the waveguide has two electric field maxima in the width direction and one maximum in the height direction.

The antennas may be used on a transmit side or a receive side of a radar system. Further, the addition of a polarization-rotating layer can allow for antennas with different native polarization orientations to communicate with one another using radio communications. For example, an antenna having a vertical polarization may transmit a signal to a receiving antenna that would otherwise have a horizontal polarization. However, by including a polarization-rotating layer and waveguide output ports, the receiving antenna can receive and convert the vertically polarized signal, thereby enabling communication between the two components.

In some applications, the inclusion of the polarization-rotating layer may allow various radars within a radar system to use different polarizations to perform measurements. Such a capability may allow multiple viewpoints (e.g., one of horizontally polarized electromagnetic energy and one of vertically polarized electromagnetic energy) of a single scene. For example, certain types of inclement weather (e.g., snow, rain, sleet, and hail) may adversely affect radar signaling. The use of multiple polarizations could reduce such an adverse effect.

Additionally or alternatively, different radars using different polarizations may prevent interference between different radars in the radar system. For example, the radar system may be configured to interrogate (i.e., transmit and/or receive radar signals) in a direction normal to the direction of travel of an autonomous vehicle via the synthetic aperture radar (SAR) functionality. Thus, the radar system may be able to determine information about roadside objects that the vehicle passes. In some examples, this information may be two dimensional (e.g., distances various objects are from the roadside). In other examples, this information may be three dimensional (e.g., a point cloud of various portions of detected objects). Thus, the vehicle may be able to "map" the side of the road as it drives along, for example. If two autonomous vehicles are using analogous radar systems to interrogate the environment (e.g., using the SAR technique described above), it could also be useful for those autonomous vehicles to use different polarizations (e.g., orthogonal polarizations) to do the interrogation, thereby preventing interference. Additionally, a single vehicle may operate two radars units having orthogonal polarizations so that each radar unit does not interfere with the other radar unit.

In some embodiments, multiple polarization-rotating layers could be cascaded together. This could increase the bandwidth of frequencies over which effective polarization conversion can occur using the corresponding antenna. Further, various combinations of cascaded polarization-rotating layers and various dimensions of the rounded rectangular polarization-rotating channels within the cascaded polarization-rotating layers could serve as a frequency filtering mechanism. Thus, the associated antennas could select specific polarizations within specific frequency bands over which to perform measurements, thereby introducing an additional method of reducing interference and providing additional radar channels for use by various different radar components in a radar system.

Referring now to the figures, FIG. 1 illustrates a unit cell of a polarization-rotating overlay 100, according to example embodiments. The polarization-rotating overlay unit cell 100 illustrated in FIG. 1 includes pegs 102, through-holes 104, and a polarization-rotating channel 106. The polarization-rotating overlay unit cell 100 may be a plate of metal, fabricated using CNC, for example. While the polarization-rotating overlay unit cell 100 may be a component of a radar antenna or a radar system, the polarization-rotating overlay unit cell 100 may be used in various other applications as well. Multiple polarization-rotating overlay unit cells 100 could further be cascaded to allow for additional rotation of polarization. Further, the cascaded polarization-rotating overlay unit cells 100 could permit an increased bandwidth of frequencies over which polarization conversion can occur.

Figure 4:
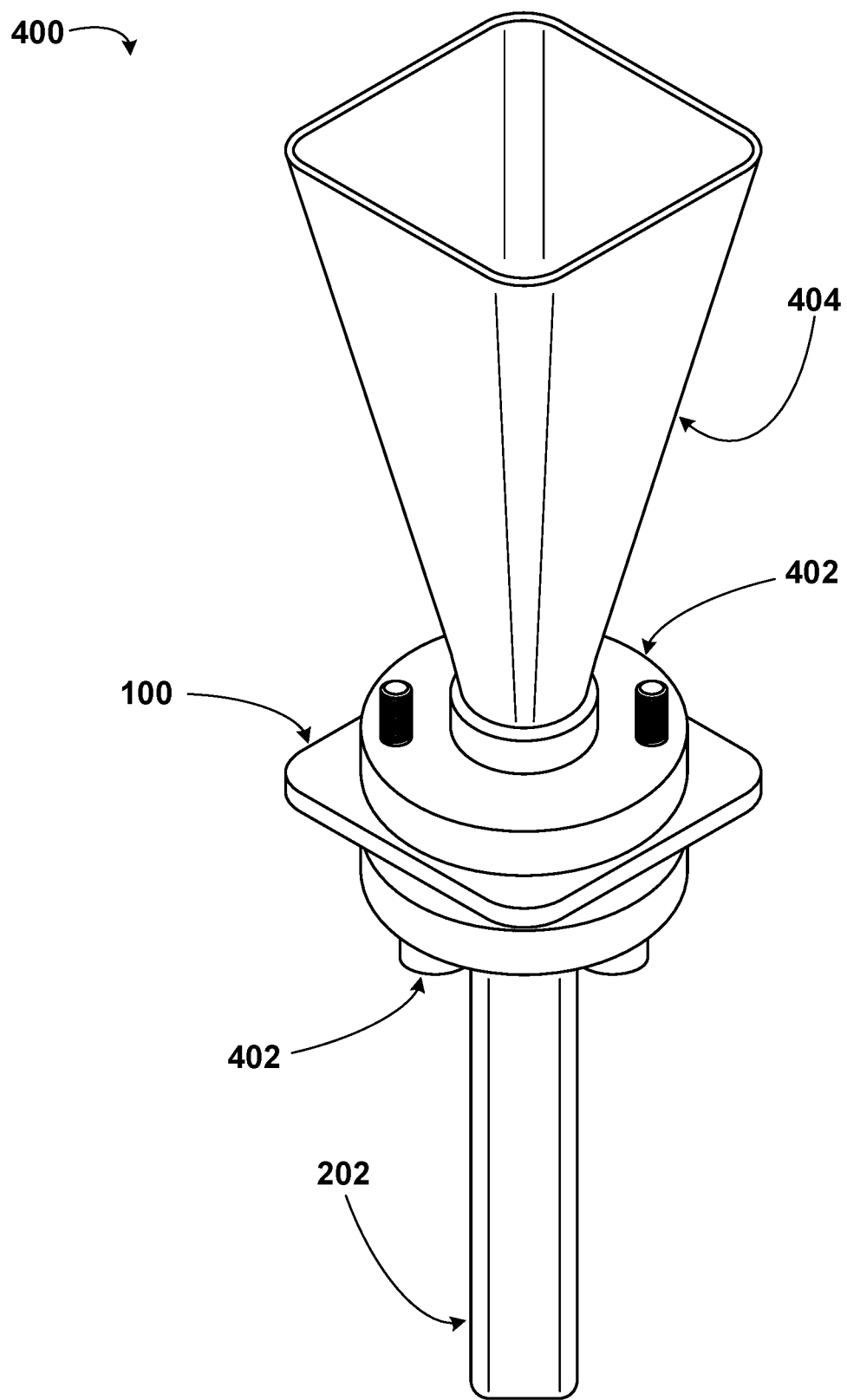
FIG. 4 illustrates a waveguide, a unit cell of a polarization-rotating overlay, and a horn antenna, according to example embodiments.

The pegs 102 can be configured to allow the polarization-rotating overlay unit cell 100 to connect to and/or align with other components. For example, the pegs 102 may align the polarization-rotating overlay unit cell 100 with alignment holes on other radar components, such as waveguides or antennas (e.g., a horn antenna as illustrated in FIG. 4). In alternate embodiments, there may be more than two pegs 102, fewer than two pegs 102, or no pegs 102 at all.

The through-holes 104 can perform similar tasks to those performed by the pegs 102 (e.g., connect and/or align the polarization-rotating overlay unit cell 100 with other components). For example, in some embodiments, the through-holes 104 may be threaded, allowing the through-holes 104 to be engaged by fasteners to connect the polarization-rotating overlay unit cell 100 to other radar components. As illustrated in FIG. 1, there are four through-holes 104. In alternate embodiments, there may be more than four through-holes 104, fewer than four through-holes 104, or no through-holes 104 at all.

The polarization-rotating channel 106, in this embodiment, is the component of the polarization-rotating overlay unit cell 100 in which electromagnetic waves undergo a rotation of polarization. The thickness of the polarization-rotating channel 106, and therefore in some embodiments the thickness of the main body of the entire polarization-rotating overlay unit cell 100, may be defined based on one or more wavelengths expected to undergo polarization rotation using the polarization-rotating overlay unit cell 100 (e.g., if the polarization-rotating overlay unit cell 100 is being used in radar applications that utilize 77 GHz electromagnetic waves, the thickness of the polarization-rotating overlay unit cell 100 could be around 3.9 mm, or about one wavelength).

An angle of the polarization-rotating channel 106 relative to one or more mounting points (e.g., the pegs 102 or the through-holes 104) may define how much polarization rotation occurs when the polarization-rotating overlay unit cell 100 acts on an electromagnetic wave. In the example embodiment illustrated in FIG. 1, the polarization-rotating channel 106 is at a 45-degree angle relative to a line between the two pegs 102. Therefore, if a waveguide aligns with the pegs 102 for example, electromagnetic waves passing through the polarization-rotating channel 106 will undergo a polarization rotation of 45 degrees. Other angles are also possible (e.g., 44 degrees or 46 degrees).

In some embodiments, the polarization-rotating channel 106 could be filled or partially filled with a material other than air. For example, a dielectric could be used to fill the polarization-rotating channel 106 to alter a resonant wavelength inside of the polarization-rotating channel 106, thereby altering an input wavelength range over which polarization-rotation can occur using the polarization-rotating overlay unit cell 100.

Still further, in some alternate embodiments, the shape of the polarization-rotating channel 106 could be changed. For example, the polarization-rotating channel 106 could be circular or substantially circular, allowing for an alignment of the polarization-rotating overlay unit cell 100 with circular waveguides. In the embodiment illustrated in FIG. 1, the polarization-rotating channel 106 has a shape of a rounded rectangle. Geometrically, such a shape can be defined as the shape obtained by taking the convex hull of four equal circles of a given radius and placing the centers of the four circles at the four corners of a rectangle having a first side length and a second side length.

Figure 2:
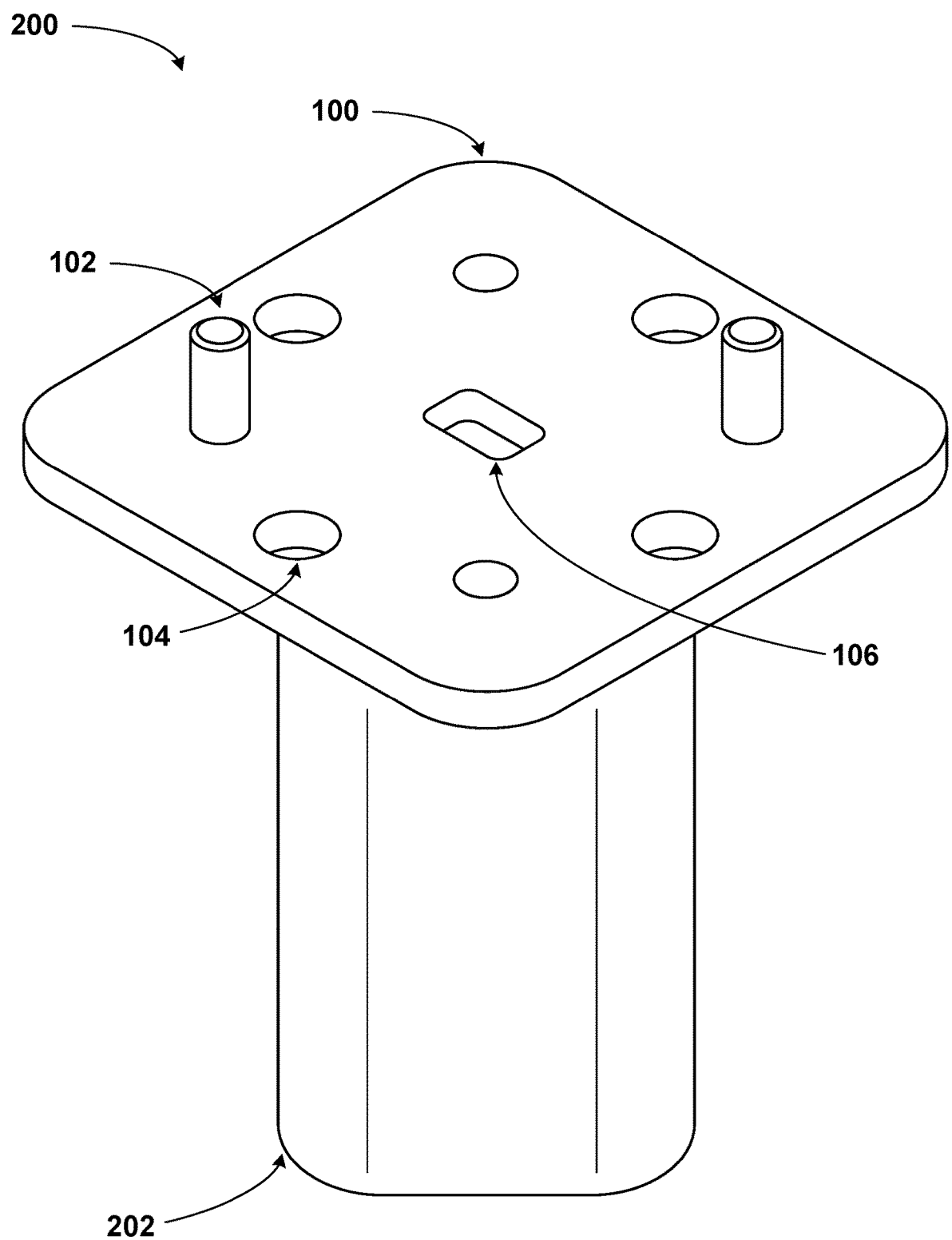
FIG. 2 illustrates a unit cell of a polarization-rotating overlay and a waveguide, according to example embodiments.

FIG. 2 illustrates a unit cell of a polarization-rotating overlay 100 and a waveguide 202, according to example embodiments. As illustrated, FIG. 2 includes the polarization-rotating overlay unit cell 100 illustrated in FIG. 1 (including the pegs 102, the through-holes 104, and the polarization-rotating channel 106), as well as a rounded rectangular waveguide 202. The rounded rectangular waveguide 202 and the polarization-rotating overlay unit cell 100 form a system 200. The rounded rectangular waveguide 202 and the polarization-rotating overlay unit cell 100 may have features sized to accommodate electromagnetic waves having a frequency of 77 GHz, for example. Other frequencies inside and outside of the radio spectrum are also possible.

As illustrated in FIG. 2, a long end of a port on the rounded rectangular waveguide 202 (e.g., the length of the rounded rectangular waveguide 202) may lie parallel to a line between the pegs 102 of the polarization-rotating overlay unit cell 100. In such an embodiment as this, the polarization-rotating channel 106 may thus lie at a 45-degree angle relative to the orientation of the port on the rounded rectangular waveguide 202 (other angles are also possible). This can allow the system 200 to be configured to radiate electromagnetic waves that have a polarization that is rotated by an angle (e.g., between 44 and 46 degrees) relative to an input polarization at a base of the rectangular waveguide 202 (e.g., a port on a side of the rounded rectangular waveguide 202 opposite of the polarization-rotating overlay unit cell 100). In other embodiments, the system 200 could be configured to receive electromagnetic waves having a particular polarization at the polarization-rotating channel 106 and rotate the polarization of the accepted electromagnetic polarization by an angle between 44 and 46 degrees (i.e., act as a receiver rather than a transmitter). In either example configuration, the system 200 could allow for communication between a component on one end (e.g., the transmit end) of a radar system to communicate with a component on a second end (e.g., a receive end) of the radar system, even if the components have different inherent polarizations. For example, the polarization-rotating channel 106 could be tuned to an appropriate angle that corresponds to the difference in polarizations between the two components.

In alternate embodiments, the rounded rectangular waveguide 202 could instead be replaced by a circular waveguide, an elliptical waveguide, or a rectangular waveguide. In such embodiments, the polarization-rotating channel 106 may consequently be designed of a different shape (e.g., circular, elliptical, or rectangular). Additionally or alternatively, the polarization-rotating overlay unit cell 100 could be used to select specific polarizations or frequencies through filtering. Such filtering considerations could also lead to variations in the shape, size, or filling material used within the polarization-rotating channel 106. In still further embodiments, the polarization-rotating channel 106 may be designed to transmit, and possibly alter, electromagnetic waves having circular or elliptical polarization.

In addition, the polarization-rotating overlay unit cell could act as a corrective iris on top of the rectangular waveguide. For example, if the rectangular waveguide is misshapen (e.g., one side of the rectangular waveguide is bent), the polarization-rotating channel within the polarization-rotating overlay unit cell could be shaped in such a way to compensate for the shape of the rectangular waveguide.

As stated above, the system 200 could be a component of a radar antenna or a radio communication system, for example. Various other applications for the system 200 illustrated in FIG. 2 are also possible. In such alternate applications, dimensions of the rounded rectangular waveguide 202 or the polarization-rotating overlay unit cell 100 could be changed to account for a given wavelength corresponding to electromagnetic waves used in the respective application, for example.

Figure 3:
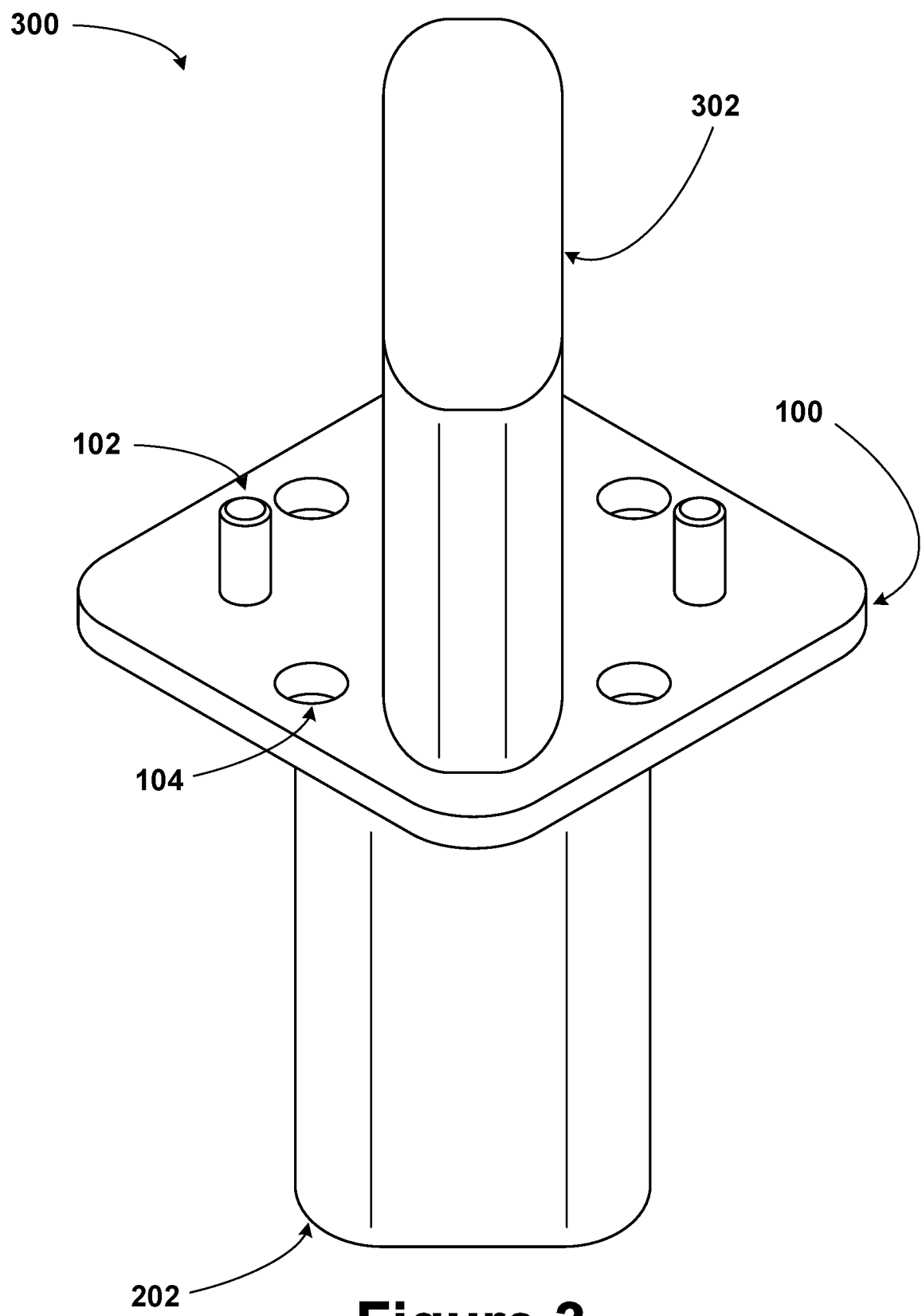
FIG. 3 illustrates a unit cell of a polarization-rotating overlay and two waveguides, according to example embodiments.

FIG. 3 illustrates a unit cell of a polarization-rotating overlay 100 and two waveguides 202/302, according to example embodiments. As illustrated, the polarization-rotating overlay unit cell 100 may be the polarization-rotating overlay unit cell 100 illustrated in FIGS. 1 and 2, and the waveguide 202 may be the rounded rectangular waveguide 202 illustrated in FIG. 2. In the embodiment of FIG. 3, the waveguide 202 may be referred to as the lower waveguide 202, and waveguide 302 may be referred to as the upper waveguide 302. The polarization-rotating overlay unit cell 100, the lower rectangular waveguide 202, and the upper rectangular waveguide 302 can together comprise a system 300. As illustrated, the system 300 may be similar to the system 200 illustrated in FIG. 2 with an addition of the upper rectangular waveguide 302 seated on or fastened to a side of the polarization-rotating overlay unit cell 100 opposite the side of the polarization-rotating overlay unit cell 100 to which the lower rectangular waveguide 202 is seated or fastened.

As illustrated, the system 300 can be configured to radiate electromagnetic waves that have a polarization rotation of 90 degrees, for example, relative to an input polarization at the base of the lower rectangular waveguide 202. Such an arrangement could allow input electromagnetic waves (e.g., at a port on a side of the lower rectangular waveguide 202 opposite of the polarization-rotating overlay unit cell 100) to be rotated from a horizontal $TE_{10}$ polarization to a vertical $TE_{10}$ polarization at the output (e.g., a port on a side of the upper rectangular waveguide 302 opposite of the polarization-rotating overlay unit cell 100), for example. Other angular rotations between input and output are also possible.

Alternatively, the system 300 could be used to receive electromagnetic waves of a given polarization at a port of the upper rectangular waveguide 302, and then rotate the polarization of the electromagnetic waves through an angle (e.g., an angle between 75 and 105 degrees) before emitting the electromagnetic waves having the rotated polarization out of a port in the base of the lower rectangular waveguide 202.

In some embodiments, the upper waveguide 302 may represent a waveguide output port of a radiating antenna, for example. Further, the lower waveguide 202 may represent a waveguide antenna element, connected to an electrical circuit within a radar system for example.

In the embodiment illustrated in FIG. 3, the upper waveguide 302 and the lower waveguide 202 may be of similar shapes and sizes, but rotated in orientation with respect to one another (e.g., at an angle between 88 and 92 degrees). Also, in addition to or alternatively to rotation with respect to one another about a vertical axis, one or both of the upper waveguide 302 and the lower waveguide 202 could be rotated with respect to an axis that lies parallel to a plane of the surface of the polarization-rotating overlay unit cell 100. In alternate embodiments, the upper waveguide 302 and the lower waveguide 202 may be different lengths, widths, heights, or shapes. Analogous to the system 200 illustrated in FIG. 2, regardless of whether the upper waveguide 302 and the lower waveguide 202 are the same shape or size as one another, one or both of the upper waveguide 302 and the lower waveguide 202 could be circular, elliptical, or rectangular waveguides, as opposed to rounded rectangular waveguides. If the respective shapes of the upper waveguide 302 and the lower waveguide 202 are not equivalent, dimensions of the respective waveguides may be altered to accommodate the shape difference (e.g., if the lower waveguide 202 is a rounded rectangle and the upper waveguide 302 is a rectangle, the lower waveguide 202 may be slightly longer or wider to accommodate equivalent modes to those accommodated by the upper waveguide 302). In still other embodiments, one or both of the upper waveguide 302 and the lower waveguide 202 could be replaced by other components (e.g., photonic components or electronic components).

FIG. 4 illustrates a waveguide 202, a unit cell of a polarization-rotating overlay 100, and a horn antenna 404, according to example embodiments. As illustrated, the polarization-rotating overlay unit cell 100 may be the polarization-rotating overlay unit cell illustrated in FIGS. 1, 2, and 3, and the waveguide 202 may be the waveguide 202 illustrated in FIGS. 2 and 3. The polarization-rotating overlay unit cell 100, the waveguide 202, and the horn antenna 404 can together comprise a system 400. Also included in the system 400 illustrated in FIG. 4, are two fastening plates 402 used to connect the other components of the system 400 (i.e., the waveguide 202, the polarization-rotating overlay unit cell 100, and the horn antenna 404) to one another. As illustrated, the system 400 may be similar to the system 200 illustrated in FIG. 2 with an addition of the horn antenna 404 fastened to a side of the polarization-rotating overlay unit cell 100 opposite the side to which the waveguide 202 is fastened.

As illustrated in FIG. 4, the polarization-rotating overlay unit cell 100 may be removably connected to the horn antenna 404 and the waveguide 202 using the fastening plates 402. The fastening plates 402, for example, may be directly connected to the horn antenna 404 and the waveguide 202, respectively, in a semi-permanent fashion (e.g., welded to the horn antenna 404 and the waveguide 202). The fastening plates 402 may then be attached to one another, the polarization-rotating overlay unit cell 100, or both, using bolts, as illustrated, for example. The bolts may replace the pegs 102 illustrated in FIG. 1. Alternatively, the bolts may be threaded through threaded ports or through-holes defined within the pegs 102 or through one or more other through-holes, such as the through-holes 104 illustrated in FIG. 1. Additionally, the system 400 may employ nuts, washers, or both to secure the fastening plates 402 to one another or to the polarization-rotating overlay unit cell 100.

In alternate embodiments, the use of fastening plates 402 within the system 400 may be superfluous. For example, the horn antenna 404, the waveguide 202, or both may be directly connected (e.g., welded or fastened) to a portion of the polarization-rotating overlay unit cell 100, thereby obviating a need to use fastening plates 402. In still other embodiments, the fastening plates 402 may be shaped differently (e.g., rectangular rather than circular).

The horn antenna 404 represents a radiating element of the system 400 illustrated in FIG. 4. The horn antenna 404 may be an alternate radiating element used in place of the upper waveguide 302 illustrated in FIG. 3. Potential advantages of using the horn antenna 404 could include improved directivity, bandwidth, and standing wave ratio (SWR) when compared with alternate antenna radiating elements such as the upper waveguide 302 illustrated in FIG. 3. In alternate embodiments, the horn antenna 404 may have an alternate shape (e.g., a sectoral horn, a conical horn, an exponential horn, a corrugated horn, a dual-mode conical horn, a diagonal horn, a ridged horn, a septum horn, or an aperture-limited horn, as opposed to a pyramidal horn) or be sized in a different way (e.g., a width dimension of an output port of the horn antenna 404 is larger than a length dimension of the output port of the horn antenna 404). Such changes to the horn antenna 404 may be made such that the horn antenna 404 radiates electromagnetic waves of different frequencies more efficiently or corresponding to different polarizations, for example. In alternate embodiments, besides those illustrated in FIGS. 3 and 4, other radiating elements are also possible (e.g., bowtie antennas or corner reflector antennas).

The horn antenna 404 may, analogous to the upper waveguide 302 illustrated in FIG. 3, radiate electromagnetic waves that have a rotated polarization from a polarization that was input to a port at a base of the waveguide 202. For example, the polarization could be rotated between 88 and 92 degrees (e.g., from roughly a horizontal $TE_{10}$ polarization to roughly a vertical $TE_{10}$ polarization, or vice versa).

Figure 5:
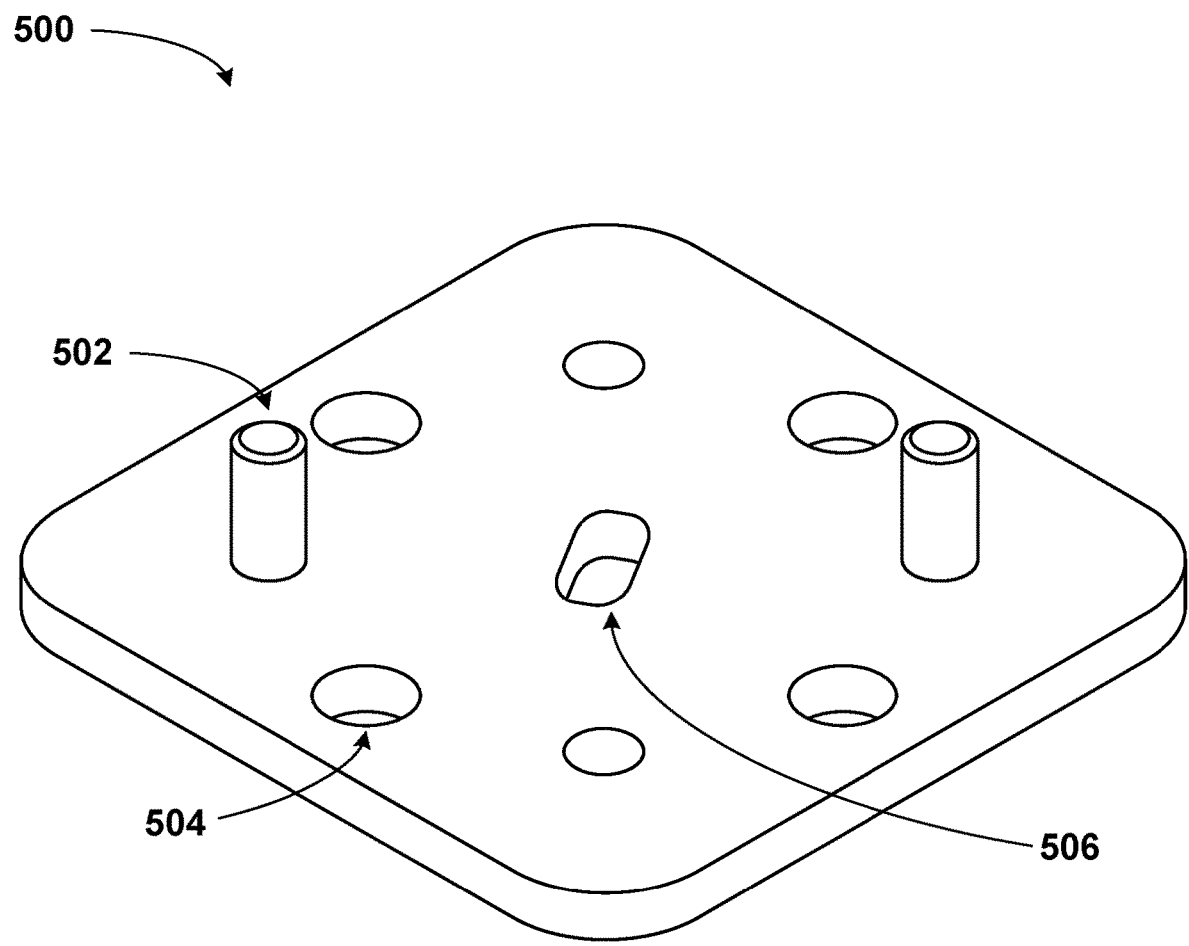
FIG. 5 illustrates a unit cell of another polarization-rotating overlay, according to example embodiments.

FIG. 5 illustrates a unit cell of another polarization-rotating overlay 500, according to example embodiments. Similar to the embodiment illustrated in FIG. 1, the polarization-rotating overlay unit cell 500 illustrated in FIG. 5 includes pegs 502, through-holes 504, and a polarization-rotating channel 506. The polarization-rotating overlay unit cell 500 may be a plate of metal, fabricated using CNC, for example, with other components defined therein (e.g., the polarization-rotating channel 506) and/or thereon (e.g., the two pegs 502). While the polarization-rotating overlay unit cell 500 may be a component of an antenna or a radar system, the polarization-rotating overlay unit cell 500 may be used in various other applications.

Multiple polarization-rotating overlay unit cells 500 could further be cascaded to allow for additional rotation of polarization. For example, nine cascaded polarization-rotating overlay unit cells, each being similar to polarization-rotating overlay unit cell 500, could each be cascaded one after another. Each of the nine cascaded polarization-rotating overlay unit cells could have successive polarization-rotating channels 506 that are offset 10 degrees from the polarization-rotating channels 506 of adjacent polarization-rotating overlay unit cells. In this way, the nine cascaded polarization-rotating overlay unit cells could rotate polarization of input electromagnetic waves to polarization of output electromagnetic waves by 90 degrees. Further, the cascaded polarization-rotating overlay unit cells could permit an increased bandwidth of frequencies over which polarization conversion can occur. For example, a set of cascaded polarization-rotating overlay unit cells could act as a broadband (in terms of accepted electromagnetic frequencies) polarization rotating device. In some embodiments, such a device could be capable of rotating any electromagnetic wave having a frequency within the "E-band" (i.e., 60-90 GHz), for example.

Similar to the embodiment illustrated in FIG. 1, the pegs 502 can be configured to allow the polarization-rotating overlay unit cell 500 to connect to and/or align with other components. For example, the pegs 502 may align the polarization-rotating overlay unit cell 500 with alignment holes on other radar components, such as waveguides or antennas (e.g., the horn antenna 404 illustrated in FIG. 4). In alternate embodiments, there may be more than two pegs 502, fewer than two pegs 502, or no pegs 502 at all.

Also analogous to the embodiment illustrated in FIG. 1, the through-holes 504 can perform similar tasks to those performed by the pegs 502 (e.g., connect and/or align the polarization-rotating overlay unit cell 500 with other components). For example, in some embodiments, the through-holes 504 may be threaded, allowing the through-holes 504 to be engaged by fasteners to connect the polarization-rotating overlay unit cell 500 to other radar components. As illustrated in FIG. 5, there are four through-holes 504. In alternate embodiments, there may be more than four through-holes 504, fewer than four through-holes 504, or no through-holes 504 at all.

The polarization-rotating channel 506, in this embodiment, is the component of the polarization-rotating overlay unit cell 500 in which electromagnetic waves undergo a rotation of polarization. The thickness of the polarization-rotating channel 506, and therefore, in some embodiments, the thickness of the main body of the polarization-rotating overlay unit cell 500, may be defined based on one or more wavelengths (or fractions of a wavelength) expected to undergo polarization-rotation using the polarization-rotating overlay unit cell 500 (e.g., if the polarization-rotating overlay unit cell 500 is being used in radar applications that utilize 77 GHz electromagnetic waves, the thickness of the polarization-rotating overlay unit cell 500 could be around 3.9 mm, or about one wavelength).

An angle of the polarization-rotating channel 506 relative to one or more mounting points (e.g., the pegs 502 or the through-holes 504) may define how much polarization-rotation occurs when the polarization-rotating overlay unit cell 500 acts on an electromagnetic wave. Unlike the embodiment illustrated in FIG. 1, however, the polarization-rotating channel 506 illustrated in FIG. 5 is rotated between 10 and 15 degrees relative to a line that is perpendicular to a line between the two pegs 502. Other angles are also possible in alternate embodiments. As stated above, smaller angles may increase the bandwidth of frequencies of incoming electromagnetic waves over which the polarization-rotating channel 506 can effectively rotate polarization, especially when multiple polarization-rotating overlay unit cells 500 are cascaded.

In some embodiments, the polarization-rotating channel 506 could be filled or partially filled with a material other than air. For example, a dielectric could be used to fill the polarization-rotating channel 506 to alter a resonant wavelength inside of the polarization-rotating channel 506, thereby altering an input wavelength range over which polarization rotation can occur using the polarization-rotating overlay unit cell 500.

Still further, in some alternate embodiments, the shape of the polarization-rotating channel 506 could be changed. For example, the polarization-rotating channel 506 could be circular or substantially circular, allowing for an alignment of the polarization-rotating overlay unit cell 500 with circular waveguides. In the embodiment illustrated in FIG. 5, the polarization-rotating channel 506 has a shape of a rounded rectangle (i.e., the shape is substantially rectangular). Geometrically, such a shape can be defined as the shape obtained by taking the convex hull of four equal circles of a given radius and placing the centers of the four circles at the four corners of a rectangle having a first side length and a second side length.

Additionally or alternatively, some embodiments may influence two or more degenerate modes to form a single circularly polarized wave. In such embodiments, it may be possible for the overlay unit cell to launch or radiate a circularly polarized wave upon receiving only linearly polarized waves as inputs. For example, this may occur in embodiments where the shape of the polarization-rotating channel is an ellipse having low eccentricity, a trapezoid, or a rectangle having nearly equal side lengths.

Figure 6:
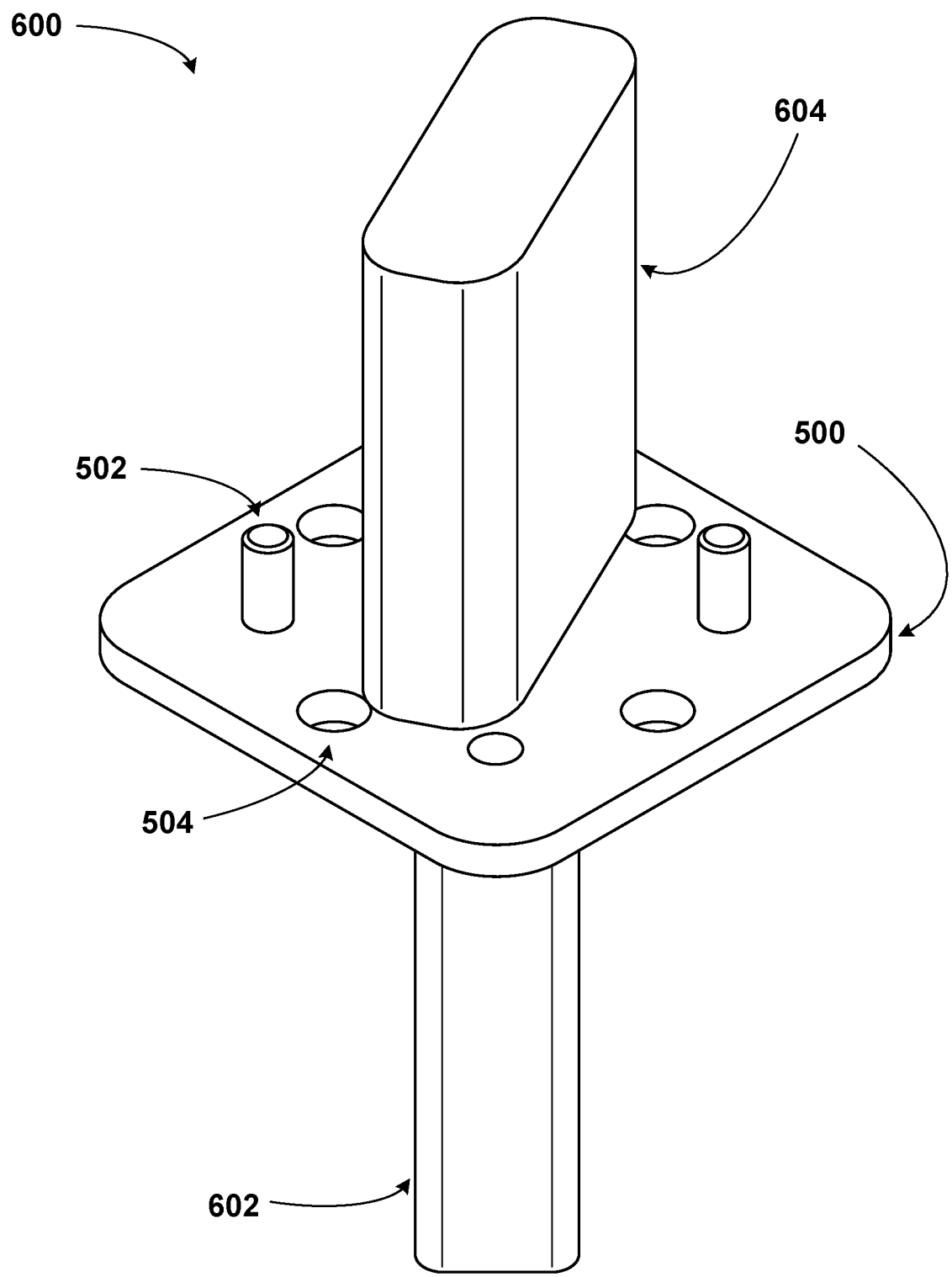
FIG. 6 illustrates a unit cell of another polarization-rotating overlay and two waveguides, according to example embodiments.

FIG. 6 illustrates a unit cell of another polarization-rotating overlay 500 and two waveguides 602/604, according to example embodiments. As illustrated, the polarization-rotating overlay unit cell 500 may be the polarization-rotating overlay unit cell 500 illustrated in FIG. 5. In the embodiment of FIG. 6, the waveguides 602/604 may respectively be referred to as the upper waveguide 604 and the lower waveguide 602. The polarization-rotating overlay unit cell 500, the lower waveguide 602, and the upper waveguide 604 can together comprise a system 600. As illustrated, the system 600 may be similar to the system 300 illustrated in FIG. 3. The primary difference, however, is the orientation of the upper waveguide 604 with respect to the polarization-rotating overlay unit cell 500 and the lower waveguide 602. As illustrated in FIG. 6, the upper waveguide 604 is angularly offset about a vertical axis from the lower waveguide 602 by roughly 30 degrees (as opposed to roughly 90 degrees, as illustrated in FIG. 3). As described above with regards to other systems and waveguides, the system 600 illustrated in FIG. 6 could be cascaded multiple times to achieve various other angles of polarization rotation (e.g., three instances of the system 600 could be cascaded to rotate polarization by roughly 90 degrees).

As described above, the system 600 can be configured to radiate electromagnetic waves that have polarization rotation of 30 degrees, for example, relative to an input polarization at the base of the lower rectangular waveguide 602. Such an arrangement could allow input electromagnetic waves (e.g., at a port on a side of the lower waveguide 602 opposite of the polarization-rotating overlay unit cell 100) to be rotated from one $TE_{10}$ polarization to another $TE_{10}$ polarization at the output (e.g., a port on a side of the upper waveguide 604 opposite of the polarization-rotating overlay unit cell 100), for example. Other angular rotations between input and output are also possible.

Alternatively, the system 600 could be used to receive electromagnetic waves of a given polarization at a port of the upper waveguide 604, and then rotate the polarization of the electromagnetic waves through an angle (e.g., an angle between 25 and 35 degrees) before emitting the electromagnetic waves having the rotated polarization out of a port in the base of the lower waveguide 602.

In some embodiments, the upper waveguide 604 may represent a waveguide output port of a radiating antenna, for example. Further, the lower waveguide 602 may represent a waveguide antenna element, connected to an electrical circuit or a feed waveguide within a radar system for example.

In the embodiment illustrated in FIG. 6, the upper waveguide 604 and the lower waveguide 602 may be of similar shapes and sizes, but rotated in orientation with respect to one another (e.g., at an angle between 25 and 35 degrees). Also, in addition to or alternatively to rotation with respect to one another about a vertical axis, one or both of the upper waveguide 604 and the lower waveguide 602 could be rotated with respect to an axis that lies parallel to a plane of the surface of the polarization-rotating overlay unit cell 500. In alternate embodiments, the upper waveguide 604 and the lower waveguide 602 may be different lengths, widths, heights, or shapes. Additionally, regardless of whether the upper waveguide 604 and the lower waveguide 602 are the same shape or size as one another, one or both of the upper waveguide 604 and the lower waveguide 602 could be circular, elliptical, or rectangular waveguides, as opposed to rounded rectangular waveguides. If the respective shapes of the upper waveguide 604 and the lower waveguide 602 are not equivalent, dimensions of the respective waveguides may be altered to accommodate the shape difference (e.g., if the lower waveguide 602 is a rounded rectangle and the upper waveguide 604 is a rectangle, the lower waveguide 602 may be slightly longer or wider to accommodate equivalent modes to those accommodated by the upper waveguide 604).

Figure 7:
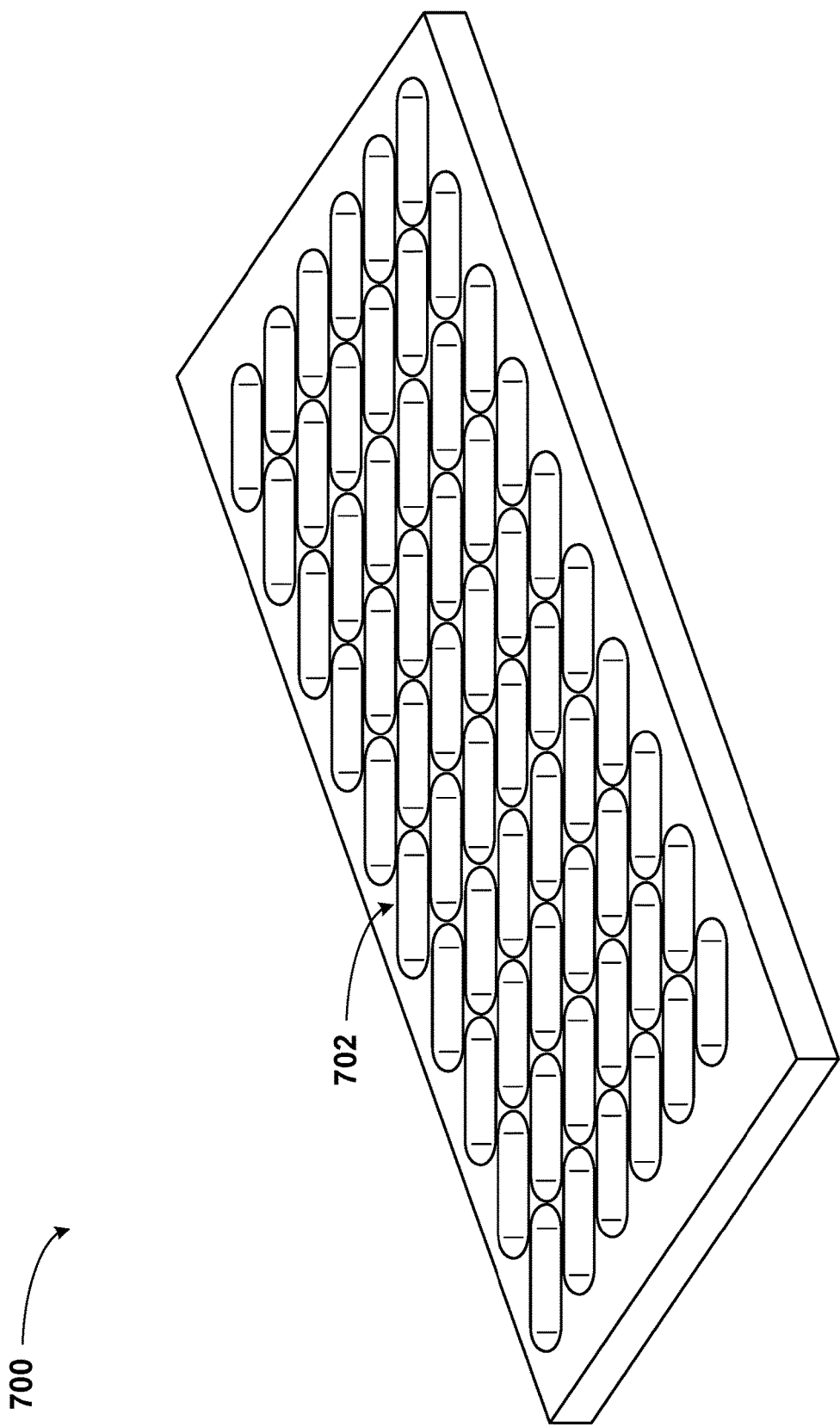
FIG. 7 illustrates a polarization-rotating layer, according to example embodiments.

FIG. 7 illustrates a polarization-rotating layer 700, according to example embodiments. The polarization-rotating layer 700 illustrated in FIG. 7 has multiple polarization-rotating channels 702 defined therein. The polarization-rotating channels 702 may form an array of polarization-rotating channels. Each polarization-rotating channels 702 may be similar to the polarization-rotating channel 106 illustrated in FIG. 1. Further, the polarization-rotating layer 700 may be designed for used with an antenna (e.g., a radar antenna), such as the antenna 900 illustrated in FIG. 9.

As illustrated, the polarization-rotating channels 702 may be defined in an array-like fashion within the polarization-rotating layer 700. The polarization-rotating channels 702 may further be at an angle between 44 and 46 degrees (e.g., 45 degrees) relative to an orientation of the polarization-rotating layer 700, for example. Other angles are also possible. Further, while the embodiment illustrated in FIG. 7 depicts each of the polarization-rotating channels 702 as having a similar orientation with respect to the polarization-rotating layer 700, this need not be the case. In alternate embodiments, the polarization-rotating channels 702 could be irregularly arranged or have different angles than one another. In some devices or systems, the polarization rotation that may occur using the polarization-rotation layer 700 may not be isotropic for all regions within the device/system.

As illustrated in FIG. 7, the polarization-rotating channels 702 have the shape of a stadium. Geometrically, a stadium (i.e., a discorectangle or an obround) is defined as a rectangle with semicircles at a pair of opposite sides. However, the polarization-rotating channels 702 may have various alternative shapes (e.g., an ellipse, a circle, a rounded rectangle, or a rectangle) or sizes (e.g., different radii, lengths, widths, etc.). Further, the polarization-rotating channels 702 may not be the same size or shape as one another. As with the angle of rotation relative to the polarization-rotating layer 700, the polarization-rotating channels 702 may have varied shapes and sizes, perhaps spaced irregularly about the polarization-rotating layer 700. Still further, the thickness of the polarization-rotating layer 700 may vary among embodiments. For example, the thickness of the polarization-rotating layer 700 may be between a half wavelength and a whole wavelength of the associated electromagnetic waves for which the polarization-rotating layer 700 is designed (e.g., between 1.45 and 3.9 mm for a polarization-rotating layer 700 designed to rotate polarization of incoming electromagnetic waves having an associated frequency of 77 GHz).

Additionally or alternatively, the polarization-rotating layer 700 could be used to select specific polarizations or frequencies through filtering. Such filtering considerations could also lead to variations in the shape, size, or filling material used within the polarization-rotating channels 702. In other embodiments, the polarization-rotating channels 702 may be designed to transmit, and possibly alter, electromagnetic waves having circular or elliptical polarization.

Figure 8A:
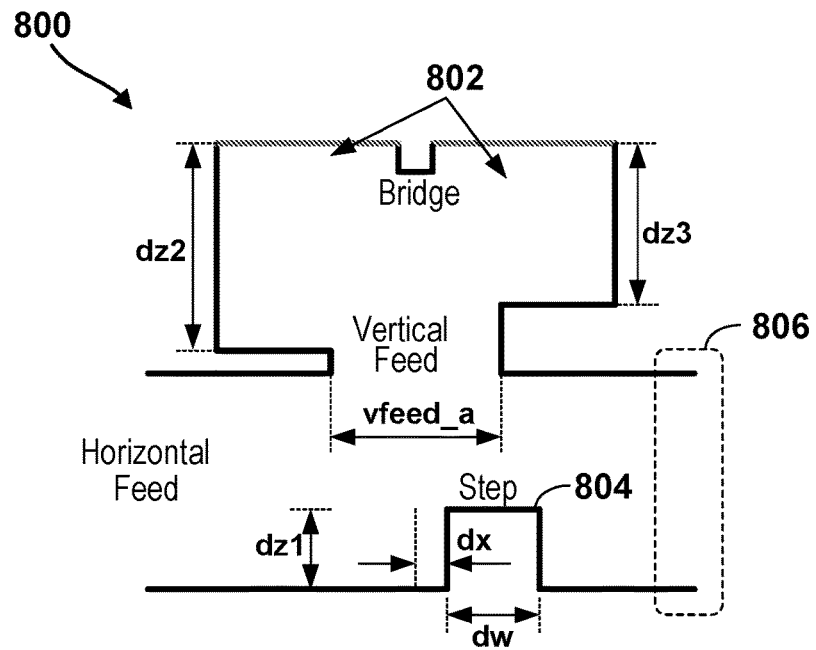
FIG. 8A illustrates a wave-radiating portion of an antenna, according to example embodiments.
Figure 8B:
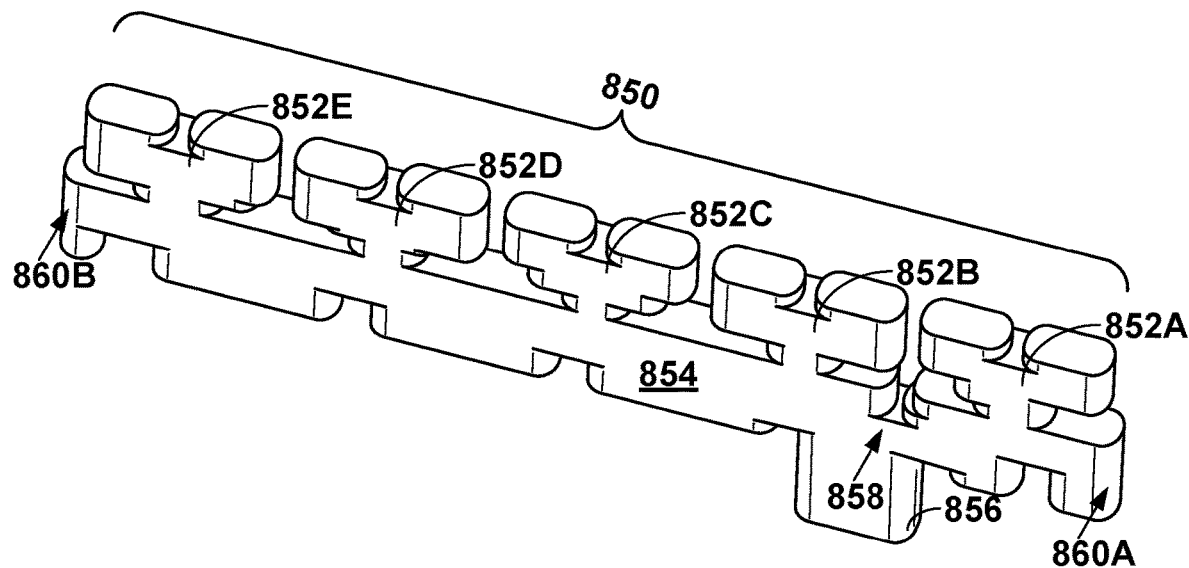
FIG. 8B illustrates another antenna, according to example embodiments.

FIG. 8A illustrates an example wave-radiating doublet of an example antenna, according to example embodiments. The example antenna could be used to radiate or receive radio waves, in example embodiments. More specifically, FIG. 8A illustrates a cross-section of an example DOEWG 800. The DOEWG 800 may include a horizontal feed (i.e., channel), a vertical feed (i.e., a doublet neck), and a wave-directing member 804. The vertical feed may be configured to couple energy from the horizontal feed to two output ports 802, each of which is configured to radiate at least a portion of electromagnetic waves out of the DOEWG 800. In some embodiments, the farthest DOEWG from the input port may include a backstop at location 806. DOEWGs that come before the last DOEWG may simply be open at location 806 and electromagnetic waves may propagate through that location 806 to subsequent DOEWGs. For example, a plurality of DOEWGs may be connected in series where the horizontal feed is common across the plurality of DOEWGs (as shown in FIG. 8B). FIG. 8A shows various parameters that may be adjusted to tune the amplitude and/or phase of an electromagnetic signal that couples into the radiating element.

In order to tune a DOEWG such as DOEWG 800, the vertical feed width, vfeed_a, and various dimensions of the step 804 (e.g., dw, dx, and dz1) may be tuned to achieve different fractions of radiated energy out the DOEWG 800. The step 804 may also be referred to as a reflecting component as it reflects a portion of the electromagnetic waves that propagate down the horizontal feed into the vertical feed. Further, in some examples, the height dz1 of the reflecting component may be negative. That is, the step 804 may extend below the bottom of the horizontal feed. Similar tuning mechanisms may be used to tune the offset feed as well. For example, the offset feed may include any of the vertical feed width, vfeed_a, and various dimensions of the step (e.g., dw, dx, and dz1) as discussed with respect to the radiating element.

In some examples, each output port 802 of the DOEWG 800 may have an associated phase and amplitude. In order to achieve the desired phase and amplitude for each output port 802, various geometrical components may be adjusted. As previously discussed, the step (reflecting component) 704 may direct a portion of the electromagnetic wave through the vertical feed. In order to adjust an amplitude associated with each output port 802 of a respective DOEWG 800, a height associated with each output port 802 may be adjusted. Further, the height associated with each output port 802 could be the height or the depth of this feed section of output port 802.

As shown in FIG. 8A, height dz2 and height dz3 may be adjusted to control the amplitude with respect to the two output ports 802. In some embodiments, such as the embodiment of FIG. 9, the two output ports 802 (given reference numeral 902 in FIG. 9) may instead be referred to as waveguide antenna elements (e.g., the waveguide antenna elements 902 illustrated in FIG. 9) as they are shaped like and may function as waveguides and further may serve to radiate or receive electromagnetic waves. The adjustments to height dz2 and height dz3 may alter the physical dimensions of the doublet neck (e.g., vertical feed of FIG. 8A). The doublet neck may have dimensions based on the height dz2 and height dz3. Thus, as the height dz2 and height dz3 are altered for various doublets, the dimensions of the doublet neck (i.e., the height of at least one side of the doublet neck) may change. In one example, because height dz2 is greater than height dz3, the output port 802 associated with (i.e., located adjacent to) height dz2 may radiate with a greater amplitude than the amplitude of the signal radiated by the output port 802 associated with height dz3.

Further, in order to adjust the phase associated with each output port 802, a step may be introduced for each output port 802. The step in the height may cause a phase of a signal radiated by the output port 802 associated with the respective step to change. Thus, by controlling both the height and the respective step associated with each output port 802, both the amplitude and the phase of a signal transmitted by the output port 802 may be controlled. In various embodiments, the steps may take various forms, such as a combination of up-steps and down-steps. Additionally, the number of steps may be increased or decreased to control the phase.

The above-mentioned adjustments to the geometry may also be used to adjust a geometry of the offset feed where it connects to the waveguide. For example, heights, widths, and steps may be adjusted or added to the offset feed in order to adjust the radiation properties of the system. An impedance match, phase control, and/or amplitude control may be implemented by adjusting the geometry of the offset feed.

FIG. 8B illustrates an example offset feed waveguide portion 856 of an example antenna 850, according to example embodiments. As shown in FIG. 8B, a waveguide 854 may include a plurality of radiating elements (shown as 852A-852E) and an offset feed 856. Although the plurality of radiating elements is shown as doublets in FIG. 8B, other radiating structures may be use as well. For example, singlets, and any other radiating structure that can be coupled to a waveguide may be used as well.

The waveguide 854 may include various shapes and structures configured to direct electromagnetic power to the various radiating elements 852A-E of waveguide 854. A portion of electromagnetic waves propagating through waveguide 854 may be divided and directed by various recessed wave-directing member and raised wave-directing members. The pattern of wave-directing members shown in FIG. 8B is one example for the wave-directing members. Based on the specific implementation, the wave-directing members may have different sizes, shapes, and locations. Additionally, the waveguide may be designed to have the waveguide ends 860A and 860B to be tuned shorts. For example, the geometry of the ends of the waveguides may be adjusted so the waveguide ends 860A and 860B act as tuned shorts.

At each junction of one of the respective radiating elements 852A-E of waveguide 854, the junction may be considered a two-way power divider. A percentage of the electromagnetic power may couple into the neck of the respective radiating elements 852A-E and the remaining electromagnetic power may continue to propagate down the waveguide. By adjusting the various parameters (e.g., neck width, heights, and steps) of each respective radiating element 852A-E, the respective percentage of the electromagnetic power may be controlled. Thus, the geometry of each respective radiating element 852A-E may be controlled in order to achieve the desired power taper. Thus, by adjusting the geometry of each of the offset feed and each respective radiating element 852A-E, the desired power taper for a respective waveguide and its associated radiating elements may be achieved.

Electromagnetic energy may be injected into the waveguide 854 via the waveguide feed 856. The waveguide feed 856 may be a port (e.g., a through-hole) in a bottom metal layer, in some embodiments. An electromagnetic signal may be coupled from outside the antenna unit into the waveguide 854 through the waveguide feed 856. The electromagnetic signal may come from a component located outside the antenna unit, such as a printed circuit board, another waveguide, or other signal source. In some examples, the waveguide feed 856 may be coupled to another dividing network of waveguides (such as illustrated in FIGS. 9 and 10).

In some examples, the present system may operate in one of two modes. In the first mode, the system may receive electromagnetic energy from a source for transmission (i.e., the system may operate as a transmission antenna). In the second mode, the system may receive electromagnetic energy from outside of the system for processing (i.e., the system may operate as a reception antenna). In the first mode, the system may receive electromagnetic energy at a waveguide feed, divide the electromagnetic energy for transmission by a plurality of radiating elements, and radiate the divided electromagnetic energy by the radiating elements. In the second mode, the system may receive electromagnetic energy at the plurality of radiating elements, combine the received electromagnetic energy, and couple the combined electromagnetic energy out of system for further processing.

It should be understood that other shapes and dimensions of the waveguide channels, portions of the waveguide channels, sides of the waveguide channels, wave-directing members, and the like are possible as well. In some embodiments, a rectangular shape of waveguide channels may be highly convenient to manufacture, though other methods known or not yet known may be implemented to manufacture waveguide channels with equal or even greater convenience.

Figure 9:
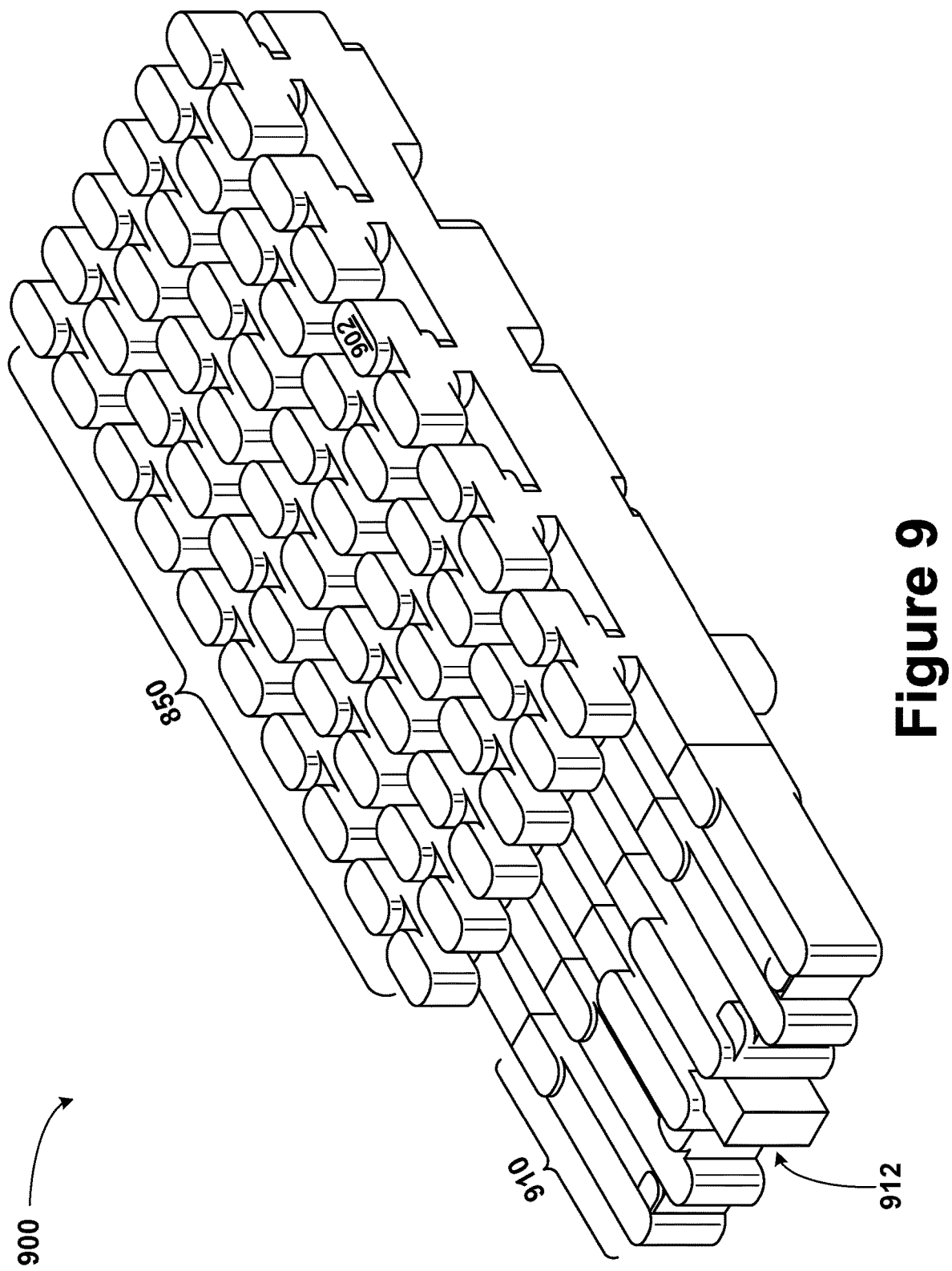
FIG. 9 illustrates an array of waveguide antenna elements, according to example embodiments.
Figure 10:
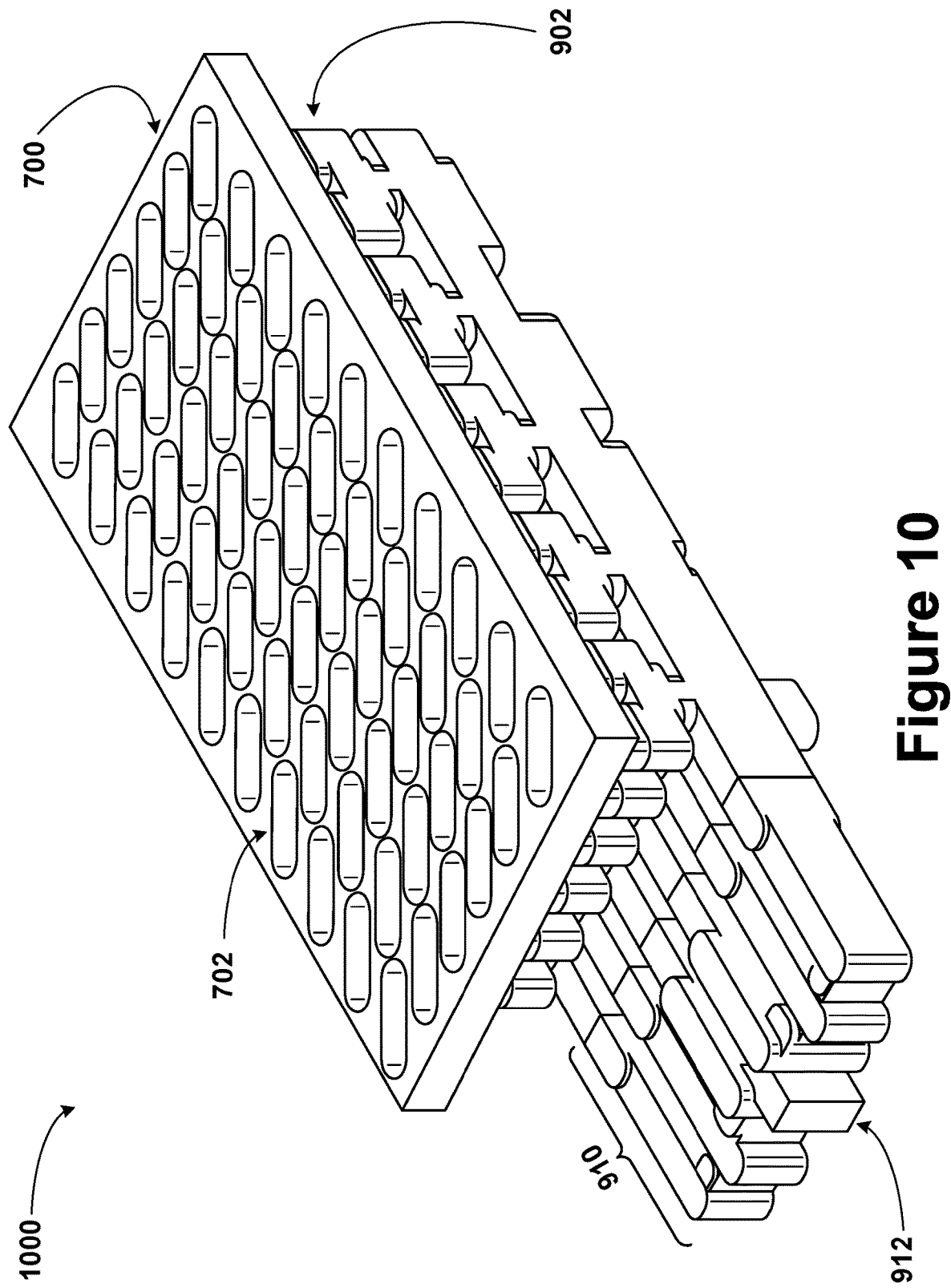
FIG. 10 illustrates an array of waveguide antenna elements and a polarization-rotating layer, according to example embodiments.

FIG. 9 illustrates an array of waveguide antenna elements 902, according to example embodiments. The size and shape of the waveguide antenna elements 902, as well as the corresponding feed waveguides illustrated in FIG. 9, may correspond to a given electromagnetic frequency (e.g., 77 GHz) and/or polarization (e.g., horizontal $TE_{10}$ polarization) for which the array of waveguide antenna elements 902 is designed to operate. Along with other components pictured, the waveguide antenna elements 902 may be part of an antenna system 900. The waveguide antenna elements 902 may be arranged in an array, as illustrated in FIG. 9. Further, the array of waveguide antenna elements 902 may be arranged in a group of individual antennas 850 as illustrated in FIG. 8. Specifically, the embodiment illustrated in FIG. 9 includes six instances of the antenna 850 illustrated in FIG. 8, resulting in a 6×10 array of waveguide antenna elements 902. Other numbers of waveguide antenna elements 902 and/or antennas 850 are also possible. The antenna system 900 may be on a transmit end and/or a receive end of a radar or radio communication system, for example. Further, two instances of the antenna system 900 can be used in conjunction with one another to form a transmit/receive system (e.g., a radio communication system). Still further, the antenna system 900 may be designed to radiate and/or receive electromagnetic waves in a $TE_{10}$ waveguide mode.

In addition to the waveguide antenna elements 902 arranged in a group of antennas 850 illustrated in FIG. 9, the antenna system 900 may additionally include a phase adjusting section 910 and a waveguide input 912. The waveguide input 912 may be connected to an electromagnetic source (e.g., a radar source), in some embodiments. The phase adjusting section 910 may adjust a phase associated with electromagnetic waves input into the waveguide input 912, for example. This could allow proper phase to be distributed to each of the waveguide antenna elements 902 when transmitting a signal. Further, the phase adjusting section 910 may be configured to divide power of an incoming electromagnetic wave among multiple feed waveguides associated with multiple instances of the antenna 850.

In some embodiments, as described above, antenna system 900 may include a series of independent antennas 850 that are connected to a common waveguide input 912. Instead of being independent antennas 850, the antennas 850 may function as a single antenna unit, as illustrated in FIG. 9. Whether the antenna system 900 describes independent antennas or a single antenna unit, the waveguide antenna elements 902 can serve to radiate electromagnetic waves and/or receive electromagnetic waves. The electromagnetic waves radiated and/or received may be transmitted down the horizontal and vertical feeds of the corresponding waveguides, as described with regard to FIG. 8.

FIG. 10 illustrates an array of waveguide antenna elements 902 and a polarization-rotating layer 700, according to example embodiments. In some embodiments, the array of waveguide antenna elements 902 may be designed according to an industry standard (e.g., an automotive industry standard) and the polarization-rotating layer 700 may be designed in such a way as to accommodate that industry standard. Alternatively, the array of waveguide antenna elements 902 and the corresponding polarization-rotating layer 700 could be designed for one or more specific applications. Collectively, the array of waveguide antenna elements 902 and the polarization-rotating layer 700 may comprise an antenna 1000. In some embodiments, as in the embodiment illustrated in FIG. 10, the antenna 1000 may additionally include the phase adjusting section 910 and/or the waveguide input 912 illustrated in FIG. 9. In the example embodiment of FIG. 10, the thickness of the polarization-rotating layer 700 could be less than a wavelength thick (e.g., between a quarter wavelength and a whole wavelength) of the electromagnetic waves which the antenna 1000 was designed to transmit or receive. Other thicknesses are also possible. Further, the antenna 1000 may be designed to radiate or receive electromagnetic waves in a $TE_{10}$ waveguide mode.

In the embodiment illustrated in FIG. 10, the polarization-rotating channels 702 defined within the polarization-rotating layer 700 may serve to rotate polarization emitted by the waveguide antenna elements 902. Thus, the electromagnetic waves radiated by the antenna 1000 may be of a polarization that is rotated with respect to a polarization that is output by the waveguide antenna elements 902. Additionally or alternatively (e.g., if the antenna 1000 is acting as a receiver within a radar system or radio communication system), the polarization-rotating channels 702 defined within the polarization-rotating layer 700 may serve to rotate a polarization associated with a received electromagnetic wave prior to transmitting the electromagnetic wave to the waveguide antenna elements 902. In some radar systems, for example, a transmitter may be configured like the antenna 1000 illustrated in FIG. 10. Such a transmitter may communicate with a receiver, also configured like the antenna 1000 illustrated in FIG. 10.

As illustrated in FIG. 10, in either of the above described cases (i.e., whether the antenna 1000 is acting as a transmitter or a receiver), the polarization radiated by or accepted by the polarization-rotating channels 702 is at an angle with respect to the waveguide antenna elements 902. This corresponding angle may be between 44 and 46 degrees (e.g., 45 degrees), for example. A variety of alternate angles may also be used in various embodiments. In still other embodiments, the polarization-rotating channels 702 need not all be disposed at the same angle relative to waveguide antenna elements 902. This could allow a corresponding antenna to radiate and receive electromagnetic waves having a variety of polarizations, for example. In yet other embodiments, the polarization-rotating channels 702 need not be all the same size and shape as one another. This could allow a corresponding antenna to radiate and receive electromagnetic waves having a variety of polarizations (e.g., if the polarization-rotating channels 702 were circular rather than stadium-shaped) and/or a variety of frequencies (e.g., if the polarization-rotating channels 702 were sized such that they were resonant at different frequencies), for example. Even further, one or more of the polarization-rotating channels 702 could be filled with a material (e.g., a dielectric material), thereby further changing one or more of the properties (e.g., resonant frequency) of the associated electromagnetic waves which could propagate through the corresponding polarization-rotating channel 702.

In alternate embodiments, two or more polarization-rotating layers 700 could be cascaded on top of the waveguide antenna elements 902. If there were multiple polarization-rotating layers 700 cascaded on top of the waveguide antenna elements 902, the corresponding polarization-rotating channels 702 could provide increased frequency bandwidth over which electromagnetic waves could be radiated or received by the corresponding antenna. Further, cascading multiple polarization-rotating layers 700 could permit an angle of polarization radiated or received to be greater or less than the angle illustrated in FIG. 10. For example, an alternate antenna may have two cascaded polarization-rotating layers. The first layer could be at an angle between 20 and 25 degrees with respect to the array of waveguide antenna elements 902, and the second layer could be at an between 20 and 25 degrees with respect to the first layer. In this way, the angle of polarization rotation undergone by electromagnetic waves (i.e., 45 degrees) would be the same as in the embodiment of FIG. 11, but the bandwidth could be increased.

The design of the antenna 1000 illustrated in FIG. 10 could also serve to reduce interference between two separate antennas. For example, a radar system could employ two antennas having analogous designs, but the polarization-rotating channels within the polarization-rotating layer of one antenna are rotated at an angle that is orthogonal to the polarization-rotating channels within the polarization-rotating layer of the other antenna. In an alternative example, two separate antennas could have polarization-rotating layers with polarization-rotating channels oriented at a parallel angle with one another, but be facing one another (e.g., if the antennas were mounted in the same orientation on vehicles travelling in opposite directions). Either of the above methods could reduce interference because the two antennas employ orthogonal polarizations. Therefore, cross pole isolation may occur between the two antennas. For example, a signal output by one antenna may be attenuated by as much as 40 dB (decibels) when transmitted through the polarization-rotating layer of the other antenna.

Figure 11:
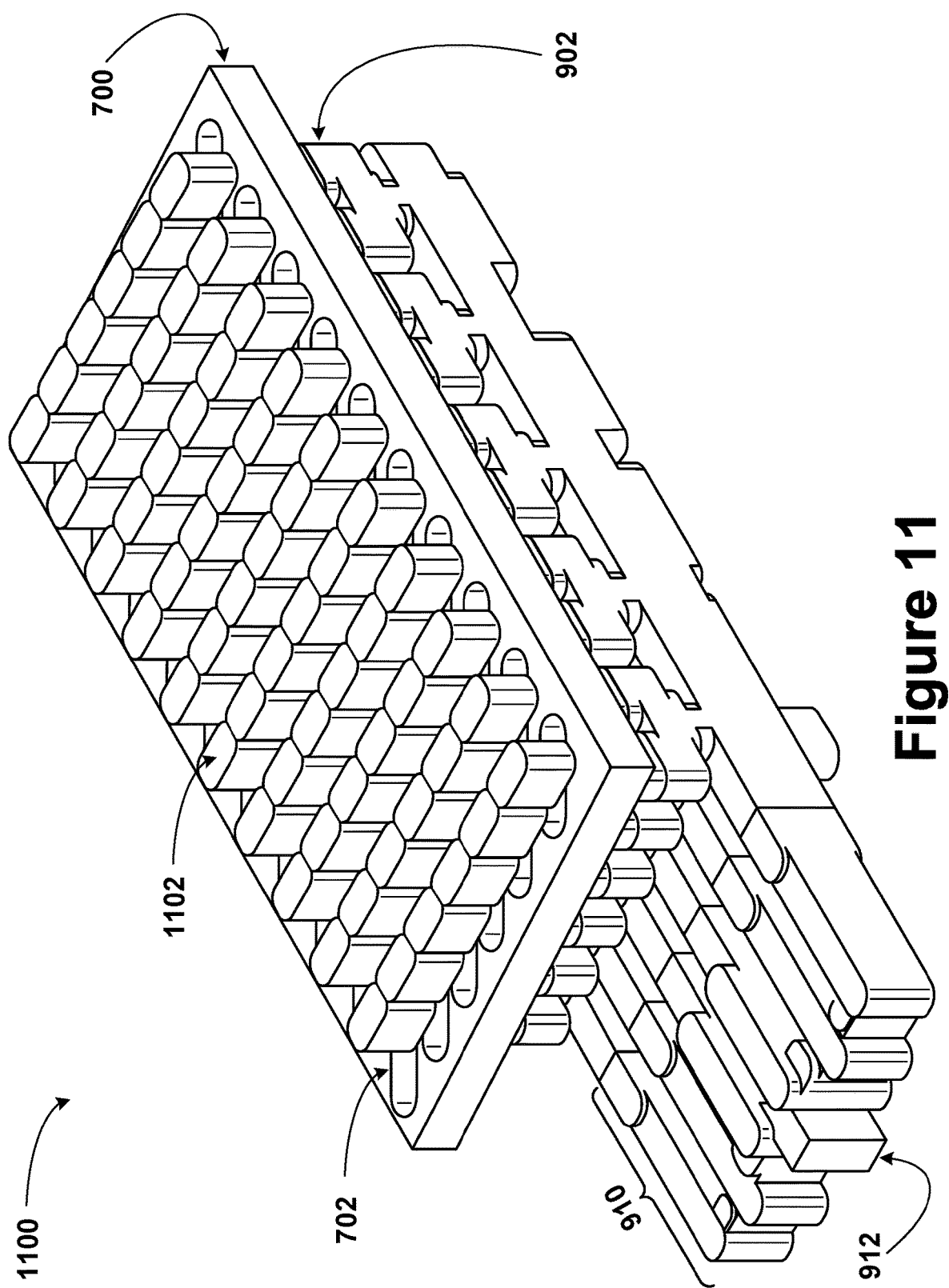
FIG. 11 illustrates an array of waveguide antenna elements, a polarization-rotating layer, and an array of waveguide output ports, according to example embodiments.

FIG. 11 illustrates an array of waveguide antenna elements 902, a polarization-rotating layer 700, and an array of waveguide output ports 1102, according to example embodiments. As illustrated, the embodiment illustrated in FIG. 11 may be analogous to the embodiment illustrated in FIG. 10 with an addition of an array of waveguide output ports 1102. The array of waveguide antenna elements 902, the polarization-rotating layer 700, and the array of waveguide output ports 1102, in addition to the phase adjusting section 910 and the waveguide input 912 may form an antenna 1100. Further, the antenna 1100 may be designed to radiate or receive electromagnetic waves in a $TE_{10}$ waveguide mode.

The antenna 1100 could be used to transmit and/or receive electromagnetic waves (e.g., radio waves) for a variety of purposes (e.g., navigation within an autonomous vehicle using radar or radio communication). In alternate embodiments, the antenna 1100 may have a greater or lesser number of waveguide antenna elements 902, waveguide output ports 1102, and/or polarization-rotating channels 702. Additionally or alternatively, the antenna 1100 may not have the phase adjusting section 910 or the waveguide input 912. For example, one or more of the individual waveguide antenna elements 902 may be fed by photonic or electronic source(s) rather than feed waveguides connected to the phase adjusting section 910 and the waveguide input 912.

In the embodiment of FIG. 11, the waveguide antenna elements 902 could output electromagnetic waves, for example. These electromagnetic waves may then propagate to the polarization-rotating channels 702. The polarization-rotating channels 702 may then serve to rotate the polarization of the associated electromagnetic waves by a defined angle (e.g., 45 degrees). The electromagnetic waves, now having an intermediate polarization, may then be transmitted to the waveguide output ports 1102. The waveguide output ports 1102 may be designed of sufficient length so as to assure that any evanescent waves, which are transmitted from the polarization-rotating channels 702 to the waveguide output ports 1102, are sufficiently attenuated before reaching radiation ports located at an end of the waveguide output ports 1102. Upon entering the waveguide output ports 1102, the electromagnetic waves may undergo another polarization rotation (e.g., by an additional 45 degrees). The associated electromagnetic waves, now having a polarization rotated by a given angle relative to the waveguide antenna elements 902 (e.g., a polarization rotated by 45 or 90 degrees; the input polarization thus being orthogonal to the output polarization) may then be radiated to the environment upon exiting the waveguide output ports 1102. This process could also occur in the pseudo-inverse to receive electromagnetic waves using the same antenna 1100 (i.e., electromagnetic waves are received by the waveguide output ports 1102, the polarization is rotated upon entering the polarization-rotating channels 702, the polarization is rotated again upon entering the waveguide antenna elements 902, and then the electromagnetic waves are transmitted to one or more devices attached to the antenna having been rotated in polarization twice).

In some embodiments, as illustrated in FIG. 11, the number of waveguide antenna elements 902 within the array, the number of polarization-rotating channels 702 defined within the polarization-rotating layer 700, and the number of waveguide output ports 1102 within the array will all be the same. In alternate embodiments, there may be greater or fewer waveguide output ports 1102 than polarization-rotating channels 702, which may in turn be greater or fewer than the number of waveguide antenna elements 902. Further, the arrangement of the array of waveguide output ports 1102 may not correspond to the arrangement of the polarization-rotating channels 702, as illustrated in FIG. 11. In some embodiments, for example, the array of waveguide output ports 1102 may be spaced irregularly or differently from the spacing of the polarization-rotating channels 702.

As illustrated in FIG. 11, each of the waveguide output ports 1102 is rotated the same amount with respect to the underlying polarization-rotating channel 702 (e.g., between 44 and 46 degrees). Further, each of the polarization-rotating channels 702 is rotated the same amount with respect to the underlying waveguide antenna element 902 (e.g., between 44 and 46 degrees). As such, in the antenna 1100 of FIG. 11, each of the waveguide output ports 1102 is rotated an equal amount with respect to the underlying waveguide antenna elements 902 (e.g., between 88 and 92 degrees). Other angles besides those illustrated in FIG. 11 are also possible. For example, the angle between the polarization-rotating channels 702 and the waveguide antenna elements 902 could be 15 degrees, and the angle between the polarization-rotating channels 702 and the waveguide output ports 1102 could be 15 degrees, resulting in an angle between the waveguide output ports 1102 and the waveguide antenna elements 902 of 30 degrees.

In alternate embodiments, the rotation of the waveguide output ports 1102 relative to the polarization-rotating channels 702 and/or the waveguide antenna elements 902 may vary among the waveguide output ports (e.g., one waveguide output port is rotated 75 degrees with respect to the underlying waveguide antenna element and another is rotated 90 degrees with respect to the underlying waveguide antenna element). Such a variation could leave to multiple polarization angles being emitted by the antenna 1100, for example. Further, such a variation in angles could cause the corresponding arrangement of waveguide output ports within the array or the corresponding size/shape of various waveguide output ports to change to accommodate such differences.

Additionally, as described above, one or more of the waveguide guide output ports 1102 could additionally or alternatively be rotated about an axis parallel to the planar surface of the polarization-rotating layer 700 (as opposed to rotated about the vertical axis that is normal to the planar surface of the polarization-rotating layer 700). This could allow for directionality of the antenna 1100, for example.

As illustrated in FIG. 11, the waveguide output ports 1102 are shaped as rounded rectangles. Further, dimensions associated with the output ports 1102 illustrated in FIG. 11 may correspond to specific wavelengths of electromagnetic waves that are to be transmitted and/or received by the antenna 1100 (e.g., wavelengths associated with electromagnetic waves having a frequency of 77 GHz). However, one or more of the waveguide output ports 1102 could be replaced by alternately shaped and/or sized output ports (e.g., a horn antenna or a substantially circular waveguide). Still further, the waveguide output ports 1102 may additionally or alternatively be wholly or partially filled with a material other than air (e.g., a dielectric material). Any of these factors (e.g., shape, size, or filling of the waveguide output ports 1102), as well as other factors, could enhance or reduce filtering characteristics associated with the antenna 1100. For example, if one or more of the waveguide output ports 1102 were filled with a dielectric, the resonant wavelength associated with the respective waveguide output port(s) 1102 may be altered, thus enhancing or diminishing the transmission of specific wavelengths through the respective waveguide output port(s) 1102.

Described above analogously, multiple layers of waveguide output port 1102 arrays could be cascaded. This could increase the bandwidth of frequencies which could effectively be used with the antenna 1102, for example. Further, such a cascading could increase or decrease an angle between the waveguide output ports 1102 and the waveguide antenna elements 902. Additionally or alternatively, alternating layers of polarization-rotating layers 700 followed by waveguide output port 1102 array layers could be cascaded to achieve similar effects. For example, an alternate antenna design may include an array of waveguide antenna elements, followed by two polarization-rotating layers, followed by an array of waveguide output ports. In such a design, there could be an angle between each successive layer performing additional polarization rotation (e.g., the polarization-rotating channels in the first polarization-rotating layer are at an angle, e.g. 25 to 35 degrees, with respect to the array of waveguide antenna elements, the polarization-rotating channels within the second polarization-rotating layer are at another angle, e.g. 25 to 35 degrees, with respect to the polarization-rotating channels in the first polarization-rotating layer, and the array of waveguide output ports are at yet another angle, e.g. 25 to 35 degrees, with respect to the polarization-rotating channels in the second polarization-rotating layer). In addition, the angles, sizes, shapes, distributions, or numbers of waveguide output ports 1102 and/or polarization-rotating channels 702 within such cascaded layers may vary from layer to layer.

Figure 12:
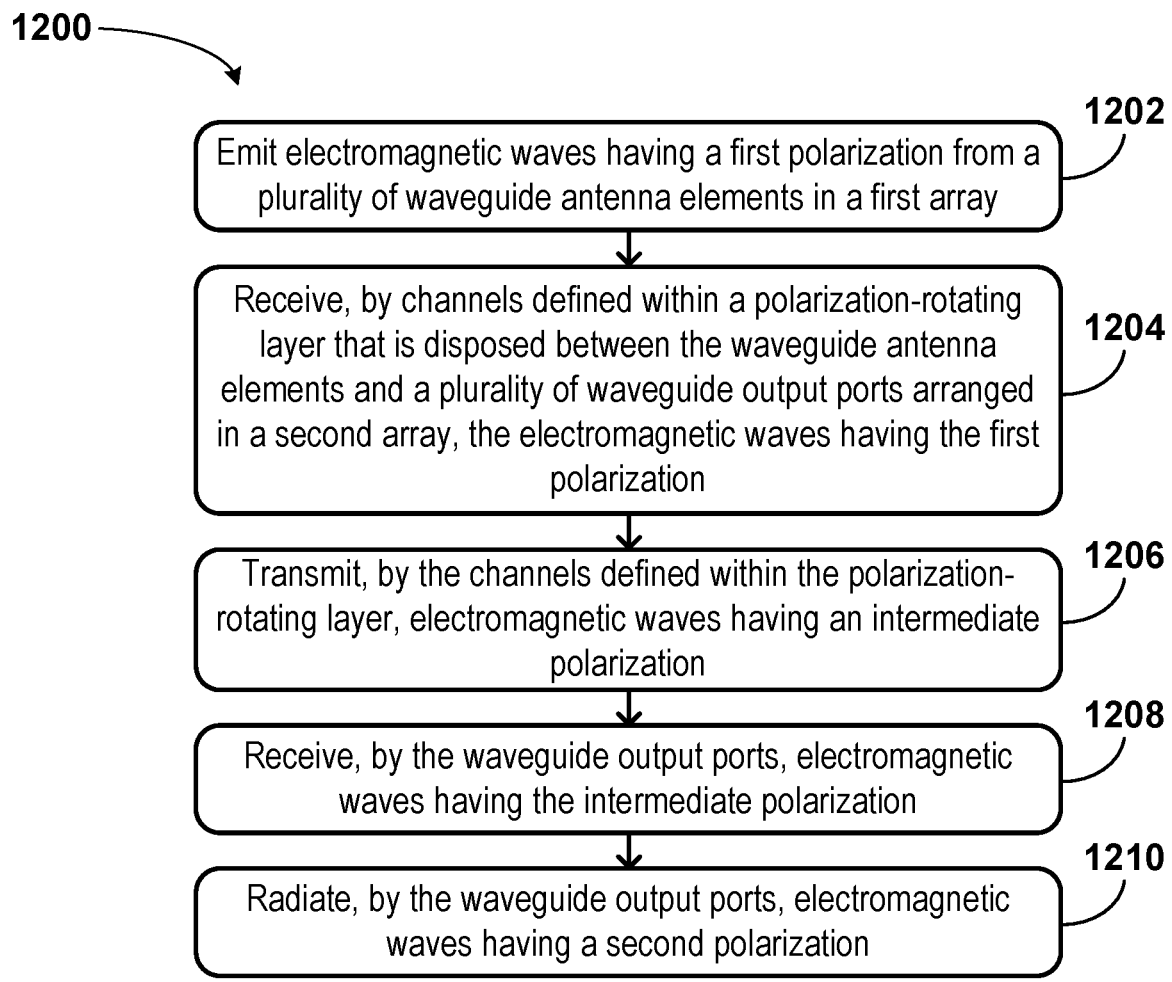
FIG. 12 illustrates a method of radiating electromagnetic waves, according to example embodiments.

FIG. 12 illustrates a method 1200 of radiating electromagnetic waves, according to example embodiments. The method 1200 may be performed using the antenna 1100 illustrated in FIG. 11, in some example embodiments. Further, the method 1200 could be performed pseudo-inversely to receive electromagnetic waves (as opposed to radiate), in some embodiments. The method 1200 may be performed to aid in navigation of an autonomous vehicle using a radar system mounted on the autonomous vehicle, for example. Alternatively, the method 1200 may be performed to communicate using radio communication techniques.

At block 1202, the method 1200 includes emitting electromagnetic waves having a first polarization from a plurality of waveguide antenna elements in a first array. The waveguide antenna elements in the first array may resemble the array of waveguide antenna elements 902 illustrated in FIG. 9, for example.

At block 1204, the method 1200 includes receiving, by channels defined within a polarization-rotating layer that is disposed between the waveguide antenna elements and a plurality of waveguide output ports arranged in a second array, the electromagnetic waves having the first polarization. The channels may be oriented at a first angle with respect to the waveguide antenna elements. The first angle may be between 44 and 46 degrees (e.g., 45 degrees), for example. Further, the polarization-rotating layer and the channels may be the polarization-rotating layer 700 and the polarization rotating channels 702, respectively, illustrated in FIG. 7, for example. Still further, the waveguide output ports may be the waveguide output ports 1102 illustrated in FIG. 11, for example.

At block 1206, the method 1200 includes transmitting, by the channels defined within the polarization-rotating layer, electromagnetic waves having an intermediate polarization.

At block 1208, the method 1200 includes receiving, by the waveguide output ports, electromagnetic waves having the intermediate polarization. The waveguide output ports may be oriented at a second angle with respect to the channels. The second angle may be between 44 and 46 degrees (e.g., 45 degrees), for example.

At block 1210, the method 1200 includes radiating, by the waveguide output ports, electromagnetic waves having a second polarization. The second polarization may be different from the first polarization. The second polarization may also be different from the intermediate polarization. Further, the first polarization may be different from the intermediate polarization. The first polarization, intermediate polarization, and second polarization could be the following, respectively: a horizontal $TE_{10}$ polarization, a $TE_{10}$ polarization at a 45-degree angle between horizontal and vertical, and a vertical $TE_{10}$ polarization.

It should be understood that other shapes and dimensions of the waveguide channels, portions of the waveguide channels, sides of the waveguide channels, wave-directing members, and the like are possible as well. In some embodiments, a rectangular shape, or a rounded rectangular shape, of waveguide channels may be highly convenient to manufacture, though other methods known or not yet known may be implemented to manufacture waveguide channels with equal or even greater convenience.

Further, it should be understood that other layouts, arrangements, amounts, or sizes of the various elements illustrated in the figures are possible, as well. For example, it should be understood that a given application of an antenna or antenna system may determine appropriate dimensions and sizes for various machined portions of the polarization-rotating overlay unit cells illustrated in the figures (e.g., channel size, metal layer thickness, etc.) and/or for other machined (or non-machined) portions/components of the antenna(s) and antenna system(s) described herein. For instance, as discussed above, some example radar systems may be configured to operate at an electromagnetic wave frequency of 77 GHz, which corresponds to millimeter electromagnetic wave length. At this frequency, the channels, ports, etc. of an apparatus may be of given dimensions appropriated for the 77 GHz frequency. Other example antennas and antenna applications are possible as well.

Still further, the word "antenna" should not be limited to applications involving electromagnetic waves solely within radio frequencies of the electromagnetic spectrum. The term "antenna" is used herein broadly to describe a device that is capable of transmitting and/or receiving any electromagnetic wave. For example, any of the antennas or components of the antennas described herein could be capable of transmitting and/or receiving optical light. Even further, any of the antennas or components of the antennas described herein could be capable of being fed by optical sources (e.g., optical fibers or optical lasers). Such example antennas could be used as optical interconnects within a computing devices, for instance. In addition, corresponding shapes and dimensions of components within such antennas may vary depending on the wavelength (e.g., components used in optical embodiments may have feature sizes on the scale of hundreds of nanometers as opposed to millimeter feature sizes in radio embodiments).

It should be understood that arrangements described herein are for purposes of example only. As such, those skilled in the art will appreciate that other arrangements and other elements (e.g., machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. An antenna, comprising:
   a plurality of waveguide antenna elements arranged in a first array configured to operate with a first polarization;
   a plurality of waveguide output ports arranged in a second array configured to operate with a second polarization, wherein the second polarization is different from the first polarization; and
   a polarization-rotating layer with channels defined therein,
   wherein the polarization-rotating layer is disposed between the waveguide antenna elements and the waveguide output ports,
   wherein the channels are oriented at a first angle with respect to the waveguide antenna elements and at a second angle with respect to the waveguide output ports,
   wherein the channels are not all the same shape,
   wherein the channels are configured to receive input electromagnetic waves having the first polarization and transmit output electromagnetic waves having a first intermediate polarization, and
   wherein the waveguide output ports are configured to receive input electromagnetic waves and radiate electromagnetic waves having the second polarization.

2. The antenna of claim 1, wherein the waveguide antenna elements and the waveguide output ports are substantially rectangular in shape.

3. The antenna of claim 1, wherein the waveguide antenna elements and the waveguide output ports are substantially circular in shape.

4. The antenna of claim 1, wherein at least one of the channels is shaped as a rounded rectangle.

5. The antenna of claim 1, wherein the first polarization is orthogonal to the second polarization.

6. The antenna of claim 1, wherein the first angle is between 44 and 46 degrees and wherein the second angle is between 44 and 46 degrees.

7. The antenna of claim 1, wherein a thickness of the polarization-rotating layer is between a half and a whole wavelength of the input electromagnetic waves having the first polarization.

8. The antenna of claim 1, wherein the channels are filled with a dielectric material.

9. The antenna of claim 1, further comprising a secondary polarization-rotating layer with secondary channels defined therein,
   wherein the secondary polarization-rotating layer is disposed between the polarization-rotating layer and the waveguide output ports,
   wherein the secondary channels are oriented at a third angle with respect to the waveguide antenna elements and at a fourth angle with respect to the waveguide output ports,
   wherein the secondary channels are configured to receive input electromagnetic waves having the first intermediate polarization and transmit output electromagnetic waves having a second intermediate polarization, and
   wherein the first intermediate polarization is different from the second intermediate polarization.

10. The antenna of claim 9, wherein a bandwidth of usable frequencies associated with the antenna lies within a 77 GHz band.

11. The antenna of claim 9, wherein the first angle is between 25 and 35 degrees, wherein the second angle is between 50 and 70 degrees, wherein the third angle is between 50 and 70 degrees, and wherein the fourth angle is between 25 and 35 degrees.

12. A radar system, comprising:
    a transmitter, comprising:
       a plurality of first waveguide antenna elements arranged in a first array configured to operate with a first polarization; and
       a first polarization-rotating layer with first channels defined therein,
       wherein the first polarization-rotating layer is disposed adjacent to the first waveguide antenna elements,
       wherein the first channels are oriented at a first angle with respect to the first waveguide antenna elements,
       wherein at least one of the first channels is filled with a first dielectric material and at least one of the first channels is not filled with the first dielectric material, and wherein the first channels are configured to receive input electromagnetic waves having the first polarization and transmit output electromagnetic waves having a second polarization; and a receiver, comprising:
 a plurality of second waveguide antenna elements arranged in a second array configured to operate with the first polarization; and
 a second polarization-rotating layer with second channels defined therein,
 wherein the second polarization-rotating layer is disposed adjacent to the second waveguide antenna elements,
 wherein the second channels are oriented at the first angle with respect to the second waveguide antenna elements, and
 wherein the second channels are configured to receive input electromagnetic waves having the second polarization and transmit output electromagnetic waves having the first polarization to the second waveguide antenna elements.

13. The radar system of claim 12,
wherein the transmitter further comprises:
 a third polarization-rotating layer with third channels defined therein,
 wherein the third polarization-rotating layer is disposed adjacent to the first polarization-rotating layer,
 wherein the third channels are oriented at a second angle with respect to the first channels, and
 wherein the third channels are configured to receive input electromagnetic waves having the second polarization and transmit output electromagnetic waves having a third polarization; and
wherein the receiver further comprises:
 a fourth polarization-rotating layer with fourth channels defined therein,
 wherein the fourth polarization-rotating layer is disposed adjacent to the second polarization-rotating layer,
 wherein the fourth channels are oriented at the second angle with respect to the second channels, and
 wherein the fourth channels are configured to receive input electromagnetic waves having the third polarization and transmit output electromagnetic waves having the second polarization to the second channels.

14. The radar system of claim 13, wherein the first angle is between 20 and 25 degrees, and wherein the second angle is between 20 and 25 degrees.

15. The radar system of claim 12, wherein the radar system is configured to be used by an autonomous vehicle for navigation.

16. The radar system of claim 12, wherein the first channels and the second channels are shaped as rounded rectangles.

17. The radar system of claim 12, wherein the first angle is between 44 and 46 degrees.

18. The radar system of claim 12, wherein a thickness of the first polarization-rotating layer is less than a wavelength of the input electromagnetic waves having the first polarization.

19. The radar system of claim 12, wherein the second channels are filled with a second dielectric material.

20. A method, comprising:
 generating, by an electromagnetic source, electromagnetic waves having a first polarization;
 emitting, from a plurality of waveguide antenna elements arranged in a first array, the electromagnetic waves;
 receiving, by channels defined within a polarization-rotating layer that is disposed between the waveguide antenna elements and a plurality of waveguide output ports arranged in a second array, the electromagnetic waves having the first polarization, wherein the channels are oriented at a first angle with respect to the waveguide antenna elements, and wherein the channels are not all the same shape;
 transmitting, by the channels defined within the polarization-rotating layer, electromagnetic waves having an intermediate polarization;
 receiving, by the waveguide output ports, electromagnetic waves having the intermediate polarization, wherein the waveguide output ports are oriented at a second angle with respect to the channels; and
 radiating, by the waveguide output ports, electromagnetic waves having a second polarization, wherein the second polarization is different from the first polarization, wherein the second polarization is different from the intermediate polarization, and wherein the first polarization is different from the intermediate polarization.

* * * * *